US007591722B2

(12) United States Patent
Baerlocher et al.

(10) Patent No.: US 7,591,722 B2
(45) Date of Patent: Sep. 22, 2009

(54) GAMING DEVICE HAVING BOARD AND CONVERTING CHIP GAME

(75) Inventors: Anthony J. Baerlocher, Reno, NV (US); William J. Bussick, Reno, NV (US); Michael MacVittie, Reno, NV (US)

(73) Assignee: IGT, Reno, NV (US)

( * ) Notice: Subject to any disclaimer, the term of this patent is extended or adjusted under 35 U.S.C. 154(b) by 920 days.

(21) Appl. No.: 10/657,409

(22) Filed: Sep. 8, 2003

(65) Prior Publication Data

US 2005/0054405 A1 Mar. 10, 2005

(51) Int. Cl.

| | |
|---|---|
| ***A63F 9/24*** | (2006.01) |
| ***A63F 13/00*** | (2006.01) |
| ***G06F 17/00*** | (2006.01) |
| ***G06F 19/00*** | (2006.01) |

(52) U.S. Cl. ................................ 463/9; 463/10; 463/14

(58) Field of Classification Search .................. 463/16, 463/20, 9, 10, 14; 273/266, 271
See application file for complete search history.

(56) References Cited

U.S. PATENT DOCUMENTS

| | | | | |
|---|---|---|---|---|
| 1,527,929 A | | 2/1925 | Simons | |
| 4,114,890 A | | 9/1978 | Yamamoto et al. | |
| 4,171,814 A | | 10/1979 | Tamano | |
| 4,508,353 A | | 4/1985 | Meyer et al. | |
| 4,582,324 A | | 4/1986 | Koza et al. | |
| 4,716,529 A | * | 12/1987 | Nakayama | 463/14 |
| 5,411,271 A | | 5/1995 | Mirando | |
| 5,536,016 A | | 7/1996 | Thompson | |
| 5,766,074 A | | 6/1998 | Cannon et al. | |
| 5,769,716 A | | 6/1998 | Saffari et al. | |
| 5,833,238 A | * | 11/1998 | Watanabe | 273/236 |
| 5,833,536 A | | 11/1998 | Davids et al. | |

(Continued)

FOREIGN PATENT DOCUMENTS

GB 2 372 617 A 8/2002

OTHER PUBLICATIONS

"Endgame Tablebase", Wikipedia. pp. 1-19. Retrieved from http://en.wikipedia.org/wiki/Endgame_tablebase on Mar. 10, 2008.*

(Continued)

*Primary Examiner*—Dmitry Suhol
*Assistant Examiner*—Jason Pinheiro
(74) *Attorney, Agent, or Firm*—K&L Gates, LLP

(57) ABSTRACT

In the game, instead of filling up an entire board as is done in the known Othello® game, a certain amount of moves are made by the game, such as two moves, while the player makes a same amount of moves. The game moves first, followed by the player. The moves flank or bound and convert at least one of the opposing chips to a chip belonging to the entity making the move. For example, upon a game move, at least one player chip is bounded or flanked by game chips and converted to a game chip. Likewise, upon a player move, at least one game chip is converted to a player chip. The game and player go back and forth in that manner until each of the game moves and player moves is exhausted. The player's remaining chips are assigned values that total to an award for the player.

20 Claims, 28 Drawing Sheets

U.S. PATENT DOCUMENTS

| | | | | |
|---|---|---|---|---|
| 5,833,537 | A | 11/1998 | Barrie | |
| 5,927,714 | A | 7/1999 | Kaplan | |
| 5,935,002 | A | 8/1999 | Falciglia | |
| 5,980,384 | A | 11/1999 | Barrie | |
| 6,056,642 | A | 5/2000 | Bennett | |
| 6,059,289 | A | 5/2000 | Vancura | |
| 6,089,976 | A | 7/2000 | Sneider et al. | |
| 6,102,798 | A | 8/2000 | Bennett | |
| 6,149,156 | A | 11/2000 | Feola | |
| 6,155,925 | A | 12/2000 | Giobbi et al. | |
| 6,159,095 | A | 12/2000 | Frohm et al. | |
| 6,159,097 | A | 12/2000 | Gura | |
| 6,159,098 | A | 12/2000 | Slomiany et al. | |
| 6,168,520 | B1 | 1/2001 | Baerlocher et al. | |
| 6,174,235 | B1 | 1/2001 | Walker et al. | |
| 6,186,894 | B1 | 2/2001 | Mayeroff | |
| 6,190,254 | B1 | 2/2001 | Bennett | |
| 6,190,255 | B1 | 2/2001 | Thomas et al. | |
| 6,203,429 | B1 | 3/2001 | Demar et al. | |
| 6,213,873 | B1 * | 4/2001 | Gasper et al. | 463/14 |
| 6,224,483 | B1 | 5/2001 | Mayeroff | |
| 6,231,442 | B1 | 5/2001 | Mayeroff | |
| 6,234,897 | B1 | 5/2001 | Frohm et al. | |
| 6,254,481 | B1 | 7/2001 | Jaffe | |
| 6,261,177 | B1 | 7/2001 | Bennett | |
| 6,302,790 | B1 | 10/2001 | Brossard | |
| 6,309,299 | B1 | 10/2001 | Weiss | |
| 6,309,300 | B1 | 10/2001 | Glavich | |
| 6,312,334 | B1 | 11/2001 | Yoseloff | |
| 6,315,660 | B1 | 11/2001 | DeMar et al. | |
| 6,315,664 | B1 | 11/2001 | Baerlocher et al. | |
| 6,319,124 | B1 | 11/2001 | Baerlocher et al. | |
| 6,322,309 | B1 | 11/2001 | Thomas et al. | |
| 6,343,988 | B1 | 2/2002 | Walker et al. | |
| 6,346,043 | B1 | 2/2002 | Colin et al. | |
| 6,347,996 | B1 | 2/2002 | Gilmore et al. | |
| 6,364,766 | B1 | 4/2002 | Anderson et al. | |
| 6,364,767 | B1 | 4/2002 | Brossard et al. | |
| 6,368,218 | B2 | 4/2002 | Angell, Jr. | |
| 6,375,187 | B1 | 4/2002 | Baerlocher et al. | |
| 6,398,218 | B1 | 6/2002 | Vancura | |
| 6,398,644 | B1 | 6/2002 | Perrie et al. | |
| 6,406,369 | B1 | 6/2002 | Baerlocher et al. | |
| 6,413,160 | B1 | 7/2002 | Vancura | |
| 6,428,412 | B1 | 8/2002 | Anderson et al. | |
| 6,439,943 | B1 | 8/2002 | Aoki et al. | |
| 6,439,993 | B1 | 8/2002 | O'Halloran | |
| 6,439,995 | B1 * | 8/2002 | Hughs-Baird et al. | 463/20 |
| 6,443,837 | B1 | 9/2002 | Jaffe et al. | |
| 6,461,241 | B1 | 10/2002 | Webb et al. | |
| 6,464,582 | B1 | 10/2002 | Baerlocher et al. | |
| 6,494,785 | B1 | 12/2002 | Gerrard et al. | |
| 6,506,114 | B1 | 1/2003 | Estes et al. | |
| 6,506,117 | B2 | 1/2003 | DeMar et al. | |
| 6,506,118 | B1 | 1/2003 | Baerlocher et al. | |
| 6,514,141 | B1 | 2/2003 | Kaminkow et al. | |
| 6,517,432 | B1 | 2/2003 | Jaffe | |
| 6,547,242 | B1 | 4/2003 | Sugiyama et al. | |
| 6,551,187 | B1 | 4/2003 | Jaffe | |
| 6,561,590 | B2 | 5/2003 | Sugden | |
| 6,565,433 | B1 | 5/2003 | Baerlocher | |
| 6,575,830 | B2 | 6/2003 | Baerlocher et al. | |
| 6,582,307 | B2 | 6/2003 | Webb | |
| 6,599,185 | B1 | 7/2003 | Kaminkow et al. | |
| 6,602,137 | B2 | 8/2003 | Kaminkow et al. | |
| 6,604,740 | B1 | 8/2003 | Singer et al. | |
| 6,607,438 | B2 | 8/2003 | Baerlocher et al. | |
| 6,609,971 | B2 | 8/2003 | Vancura | |
| 6,666,765 | B2 | 12/2003 | Vancura | |
| 6,685,561 | B2 | 2/2004 | Anderson et al. | |
| 6,731,313 | B1 | 5/2004 | Kaminkow | |
| 6,830,513 | B1 * | 12/2004 | Ballard | 463/14 |
| 7,018,293 | B2 * | 3/2006 | Brown et al. | 463/20 |
| 7,077,744 | B2 * | 7/2006 | Cannon | 463/20 |
| 7,168,704 | B1 * | 1/2007 | Lawless | 273/237 |
| 2002/0068623 | A1 | 6/2002 | Gauselmann | |
| 2002/0090988 | A1 * | 7/2002 | Frost et al. | 463/17 |
| 2002/0160836 | A1 * | 10/2002 | Watanabe et al. | 463/42 |
| 2003/0027615 | A1 * | 2/2003 | Sousumi | 463/14 |
| 2003/0100356 | A1 | 5/2003 | Brown et al. | |
| 2003/0125100 | A1 * | 7/2003 | Cannon | 463/16 |
| 2003/0203752 | A1 | 10/2003 | Kaminkow et al. | |
| 2003/0203753 | A1 | 10/2003 | Muir et al. | |

OTHER PUBLICATIONS

"Reversi for Windows" advertisement website page http://www.guidebookgallery.org/screenshots/win203, released in 1998, printed on Dec. 28, 2006.

Game Quest Advertisement, written by IGT, published 2002.

Orthello website, printed from www.mattelothello.com on Jul. 7, 2003.

Slots 2003 Article written by Strictly Slots, published Jan. 2003.

Windows 2.03 screenshot, printed from www.guidebookgallery.org/screenshots/win203 on Dec. 28, 2006.

* cited by examiner

FIG. 25

14

80

| | Possible Outcomes From Game Pick III, Player Pick A | No. of Player Chips Yielded From Final Player Pick | Ave. Chips From Final Game Pick | Overall Average Chips From Game Pick III, Player Pick A | n= Overall Chips / Game Pick Chips | For III, A Outcomes, % Likelihood of Last Game Pick (n x 20%) |
|---|---|---|---|---|---|---|
| FIG. 8 | III,A,1,a | 4 | 4.25 | 4.088 | .961 | 19.2% Chance That Game Picks 1 in Fig. 5 |
| | III,A,1,b | 5 | | | | |
| | III,A,1,c | 4 | | | | |
| | III,A,1,d | 4 | | | | |
| FIG. 9 | III,A,2,a | 4 | 4.20 | 4.088 | .973 | 19.5% Chance That Game Picks 2 in Fig. 5 |
| | III,A,2,b | 5 | | | | |
| | III,A,2,c | 4 | | | | |
| | III,A,2,d | 4 | | | | |
| | III,A,2,e | 4 | | | | |
| FIG. 10 | III,A,3,a | 4 | 4 | 4.088 | 1.022 | 20.4% Chance That Game Picks 3 in Fig. 5 |
| | III,A,3,b | 4 | | | | |
| | III,A,3,c | 4 | | | | |
| | III,A,3d | 4 | | | | |
| FIG. 11 | III,A,4,a | 4 | 4 | 4.088 | 1.022 | 20.4% Chance That Game Picks 4 in Fig. 5 |
| | III,A,4,b | 4 | | | | |
| | III,A,4,c | 4 | | | | |
| FIG. 12 | III,A,5,a | 4 | 4 | 4.088 | 1.022 | 20.4% Chance That Game Picks 5 in Fig. 5 |
| | III,A,5,b | 4 | | | | |
| | III,A,5,c | 5 | | | | |
| | III,A,5d | 4 | | | | |
| | III,A,5e | 4 | | | | |

FIG. 26

14

90

| | Possible Outcomes From Game Pick III, Player Pick B | No. of Player Chips Yielded From Final Player Pick | Ave. Chips From Final Game Pick | Overall Average Chips From Game Pick III, Player Pick B | n= Overall Chips / Game Pick Chips | For III, B Outcomes, % Likelihood of Last Game Pick (n x 25%) |
|---|---|---|---|---|---|---|
| FIG. 13 | III,B,1,a | 4 | 4 | 4.25 | 1.063 | 26.6% Chance That Game Picks 1 in Fig. 6 |
| | III,B,1,b | 4 | | | | |
| | III,B,1,c | 4 | | | | |
| | III,B,1,d | 4 | | | | |
| | III,B,1,e | 4 | | | | |
| FIG. 14 | III,B,2,a | 4 | 4 | 4.25 | 1.063 | 26.6% Chance That Game Picks 2 in Fig. 6 |
| | III,B,2,b | 4 | | | | |
| | III,B,2,c | 4 | | | | |
| | III,B,2,d | 4 | | | | |
| | III,B,2,e | 4 | | | | |
| FIG. 15 | III,B,3,a | 5 | 5 | 4.25 | .85 | 21.2% Chance of Picking 3 in Fig. 6 |
| | III,B,3b | 5 | | | | |
| FIG. 16 | III,B,4,a | 4 | 4 | 4.25 | 1.063 | 26.6% Chance of Picking 4 in Fig. 6 |
| | III,B,4,b | 4 | | | | |
| | III,B,4,c | 4 | | | | |
| | III,B,4d | 4 | | | | |
| | III,B,4,e | 4 | | | | |
| | III,B,4,f | 4 | | | | |

FIG. 27

95 14

| | Possible Outcomes From Game Pick III, Player Pick C | No. of Player Chips Yielded From Final Player Pick | Ave. Chips From Final Game Pick | Overall Average Chips From Game Pick III, Player Pick C | n= Overall Chips / Game Pick Chips | For III, C Outcomes, % Likelihood of Last Game Pick (n x 20%) |
|---|---|---|---|---|---|---|
| FIG. 17 | III,C,1,a | 4 | 4 | 4 | 1 | 20.% Chance of Game Picking 1 in Fig. 7 |
| | III,C,1,b | 4 | | | | |
| | III,C,1,c | 4 | | | | |
| | III,C,1,d | 4 | | | | |
| | III,C,1,e | 4 | | | | |
| | III,C,1,f | 4 | | | | |
| FIG. 18 | III,C,2,a | 4 | 4 | 4 | 1 | 20.% Chance of Game Picking 2 in Fig. 7 |
| | III,C,2,b | 4 | | | | |
| | III,C,2,c | 4 | | | | |
| | III,C,2,d | 4 | | | | |
| | III,C,2,e | 4 | | | | |
| | III,C,2,f | 4 | | | | |
| | III,C,2,g | 4 | | | | |
| FIG. 19 | III,C,3,a | 4 | 4 | 4 | 1 | 20.% Chance of Game Picking 3 in Fig. 7 |
| | III,C,3,b | 4 | | | | |
| | III,C,3,c | 4 | | | | |
| | III,C,3d | 4 | | | | |
| FIG. 20 | III,C,4,a | 4 | 4 | 4 | 1 | 20.% Chance of Game Picking 4 in Fig. 7 |
| | III,C,4,b | 4 | | | | |
| | III,C,4,c | 4 | | | | |
| FIG. 21 | III,C,5,a | 4 | 4 | 4 | 1 | 20.% Chance of Game Picking 5 in Fig. 7 |
| | III,C,5,b | 4 | | | | |
| | III,C,5,c | 4 | | | | |
| | III,C,5,d | 4 | | | | |
| | III,C,5,e | 4 | | | | |
| | III,C,5,f | 4 | | | | |

FIG. 46

220

| VALUE | PERCENT |
|---|---|
| 1 | .2 |
| 2 | .3 |
| 3 | .5 |
| 4 | 1 |
| 5 | 1.5 |
| 6 | 2.0 |
| 7 | 2.5 |
| 8 | 2.5 |
| 9 | 2.5 |
| 10 | 2.5 |
| 15 | 2.5 |
| 18 | 3.0 |
| 19 | 3.0 |
| 20 | 3.0 |
| 23 | 3.0 |
| 25 | 3.0 |
| 27 | 3.5 |
| 30 | 3.5 |
| 32 | 3.5 |
| 33 | 3.5 |
| 35 | 3.0 |
| 40 | 3.0 |
| 45 | 3.0 |
| 50 | 3.0 |
| 55 | 3.0 |
| 60 | 2.5 |
| 65 | 2.5 |
| 65 | 2.5 |
| 70 | 2.5 |
| 75 | 2.5 |
| 80 | 2.5 |
| 85 | 2.0 |
| 90 | 1.5 |
| 95 | 1 |
| 100 | .3 |
| 150 | .2 |
| 200 | .2 |
| 250 | .1 |
| 300 | .1 |
| 500 | .05 |
| 1000 | .05 |

14

| MULTIPLIER | PERCENT |
|---|---|
| 2X | .5 |
| 3X | 1.5 |
| 5X | 2.0 |
| 7X | 2.5 |
| 10X | 3.5 |
| 15X | 3.5 |
| 20X | 2.5 |
| 25X | 2.0 |
| 30X | 1.5 |
| 50X | .5 |

GAMING DEVICE HAVING BOARD AND CONVERTING CHIP GAME

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND OF THE INVENTION

The present invention relates to wagering games and gaming devices. More particularly, the present invention relates to a game in which the player plays against a foe such as another player or a gaming device processor.

The Othello® game is one of the most popular board games sold today. Othello® is a trademark of Anjar Co. Corporation. The basic idea of the Othello® game involves capturing an opponent's chips by turning them into the player's color. The winner at the end of the game has to have most of that player's color (typically either black or white) showing on a game board.

To capture an opponent's chip or row of chips, the player must border each end of the chip or row by a chip of the player's color. That is, all of the opponent's chips along an imaginary line drawn between the player's bordering chips turn to the player's color. To that end, the player's placement of a chip can capture multiple numbers of the opponent's chips in one or more rows, e.g., in a multitude of horizontal, vertical and/or diagonal directions, at the same time.

The corners of the Othello® board are valuable because corner chips can never be recaptured and can often protect whole collections of the player's chips from capture. The corners are so important that the players typically avoid playing near them until forced to do so. Edges of the Othello® board are also important because chips placed on the edges are more difficult to capture than chips in the middle of the board. In combination, the corner and edge positions give the player control in the game.

In the game, if the player's opponent is able to capture chips on the board, the opponent must play even if it would be advantageous to pass. Similar to chess, the opponent can be made to make a move that player would rather not make, e.g., to enable the player to capture an edge or corner. If the opponent is unable to capture any chips via a move, the opponent has to pass enabling the player to make two moves in a row.

The Othello® game is entertaining and easy to learn. The game, however, presents obstacles to being implemented in a gaming device, in which the player plays against a machine. For instance, how does the game processor know where to place a chip? If multiple spots exist for placing a chip, how does the processor know which spot the processor should choose? Moreover, what constitutes a gaming device win for such a base or bonus game?

U.S. Patent Application 2003/0100356 describes an Othello® type wagering gaming device having base and bonus game based loosely on the Othello® game. While one of the bonus games involve "flanking" or "bounding" the game's chips with player chips, none of the games in the application provides the game's chips a chance to counter a move by the player (if player selected) or for the player (if game selected for the player). That is, the application does not describe how the game or entity playing against the player can win back chips captured by the player or win new chips based on a move made by the player.

Further, while it is desirable in one aspect to implement the Othello® game into a primary or secondary gaming device, it is also desirable to expand or improve the existing Othello® game either as a non-wagering or wagering game.

SUMMARY OF THE INVENTION

The present invention includes multiple embodiments of a game piece switching game. The present invention adapts the known and popular game Othello®. The adapted game is implemented either on a gaming device video display, or a data network, such as a an internet, in a handheld device or on a physical playing board. That is, the game may be played to win an award or simply to accumulate points for fun.

In one embodiment, the game provides a limited number of game moves and player moves. That is, instead of filling up the entire board as is done in the Othello® game, the game makes a certain amount or number of moves, such as two moves, while the player makes a same amount or number of moves, such as two moves. In one such embodiment, the game moves first, followed by the player. The moves each convert at least one of the opposing chips to the entity making the move. For example, upon a game move, at least one player chip is converted to a game chip. Likewise upon a player move, at least one game chip is converted to a player chip. The game and player go back and forth in this manner until each of the game moves and player moves is exhausted.

After exhausting each side's moves, the gaming device displays values associated with each of the player's remaining chips. In one embodiment, the gaming device assigns values or other outcomes to the fixed positions of a grid or board upon which the game and player place the chips. The values represent credit multipliers, credits, a number of picks from a prize pool, a number of free spins, a number of free games, a non-monetary award and any combination of those, or any other suitable value or award. In one embodiment, the game does not reveal the values to the player until the game is over. When the player and game have each made their allotted moves, the game reveals the values associated with the positions occupied by the player's chips.

The player's ultimate award is a combination of the number of remaining player chips and the values associated with the positions occupied by those chips. In one embodiment, the gaming device attempts to remove skill from the game by weighting the different options available to the game so that the player on average ends up with approximately the same number of remaining chips regardless of which of a number of positions the game fills. In one embodiment, the random generation of values for the positions adds a random component to the player's ultimate award. In such an embodiment, the net effect is a game that appears to be fraught with skill, but which ultimately boils down to the random generation of values for the positions that are occupied by the player's remaining chips. In an alternative embodiment, the player's award or outcome is decided independently and the positions of the player's chips are used to display such outcome in a suitable manner or distribution.

In another embodiment, the values associated with the positions are displayed to the player. A number of embodiments described herein set forth different manners of revealing those values. In one implementation, the game reveals the value of the position whenever one of the player's chips is placed on one of the positions. Then, if the position is converted to a game chip, the gaming device in one preferred embodiment maintains the display of the value. This way, the player viewing the game grid can at least partially determine which game pieces are the most valuable ones to convert. Once the player and game exhaust the allotted number of placements, the gaming device reveals the remaining values in one embodiment.

In another alternative embodiment, the gaming device displays the values associated with each of the positions to the player prior to and during game play. Here, the player can view and learn the values associated with the game grid and tailor the player's moves with the hopes of capturing the most lucrative values or points. The gaming device is also programmed to attempt to acquire the most lucrative values in one embodiment. If the game is played by two players, each player attempts to optimize the points or values garnered via the placement of chips. The moves made by the player or game may be contrary to the smartest move that would be made in the known Othello® game, wherein for example the player foregoes capturing more values or obtaining a coveted end or corner position to instead obtain a lesser amount to converted chips or interior chips placed on positions having higher associated values.

In yet another alternative embodiment, the values or points are associated with the playing pieces rather than with the positions of the game board. In one implementation, the player is provided with a stable of game pieces, such as six to eight game pieces. When the player's turn is up, the player chooses not only where to place a chip, but what value or importance to put on that chip. Thus, if the move is one of the initial moves of the game in the middle of the board, the player may wish to place a game piece having a relatively low value in one of the available positions. On the other hand, if the player has the option to capture a corner position, which can never be converted to the other player's or to the game's chips, the player likely places the highest available game piece in that corner position.

The addition of values to the game piece switching game adds an additional layer of dynamics to the game play. To that end, any of the games described herein can employ mystery values instead of initially fixed values. The mystery values add excitement and enjoyment because the player has to decide in certain cases between a displayed fixed value or a mystery value, which may be greater or less than the fixed value. The mystery values are eventually revealed to the player. The player no longer has to achieve the most pieces on the game board to win. Rather, the player needs to achieve the most points or the highest award.

In one alternative embodiment, two players play against each other on a gaming device. That gaming device may be a wagering gaming device. The players may each for example place a wager and play one of the games described herein. The loser in the example pays a portion of the loser's wager to the winner and a portion to the house.

In another embodiment, any of the games described herein are placed in a hand held game. The player can otherwise play against a computer chip stored in the hand held device or against another player. Still further, any of the games described herein can be downloaded to the player via a data network, such as an internet. The player then plays the games in a wagering format or for fun on the player's video monitor of the player's home or work PC.

It is therefore an advantage of the present invention to provide a fun and exciting wagering game that appears to require skill.

It is another advantage of the present invention to provide a wagering game having a high amount of player interaction.

It is yet another advantage of the present invention to provide a method for making player outcomes at least partially standard regardless of the which choices the game and the game's choices.

Additional features and advantages of the present invention are described in, and will be apparent from, the following Detailed Description of the Invention and the figures.

BRIEF DESCRIPTION OF THE FIGURES

FIGS. 25, 26 and 27 are tables illustrating one method for determining likelihood of generation percentages for the outcomes illustrated in FIGS. 3 to 21.

FIG. 46 is a table illustrating one possible weighted value distribution for values associated with positions or player chips of the present invention, the values forming a basis for the player's award.

DETAILED DESCRIPTION OF THE INVENTION

Figure 1A:
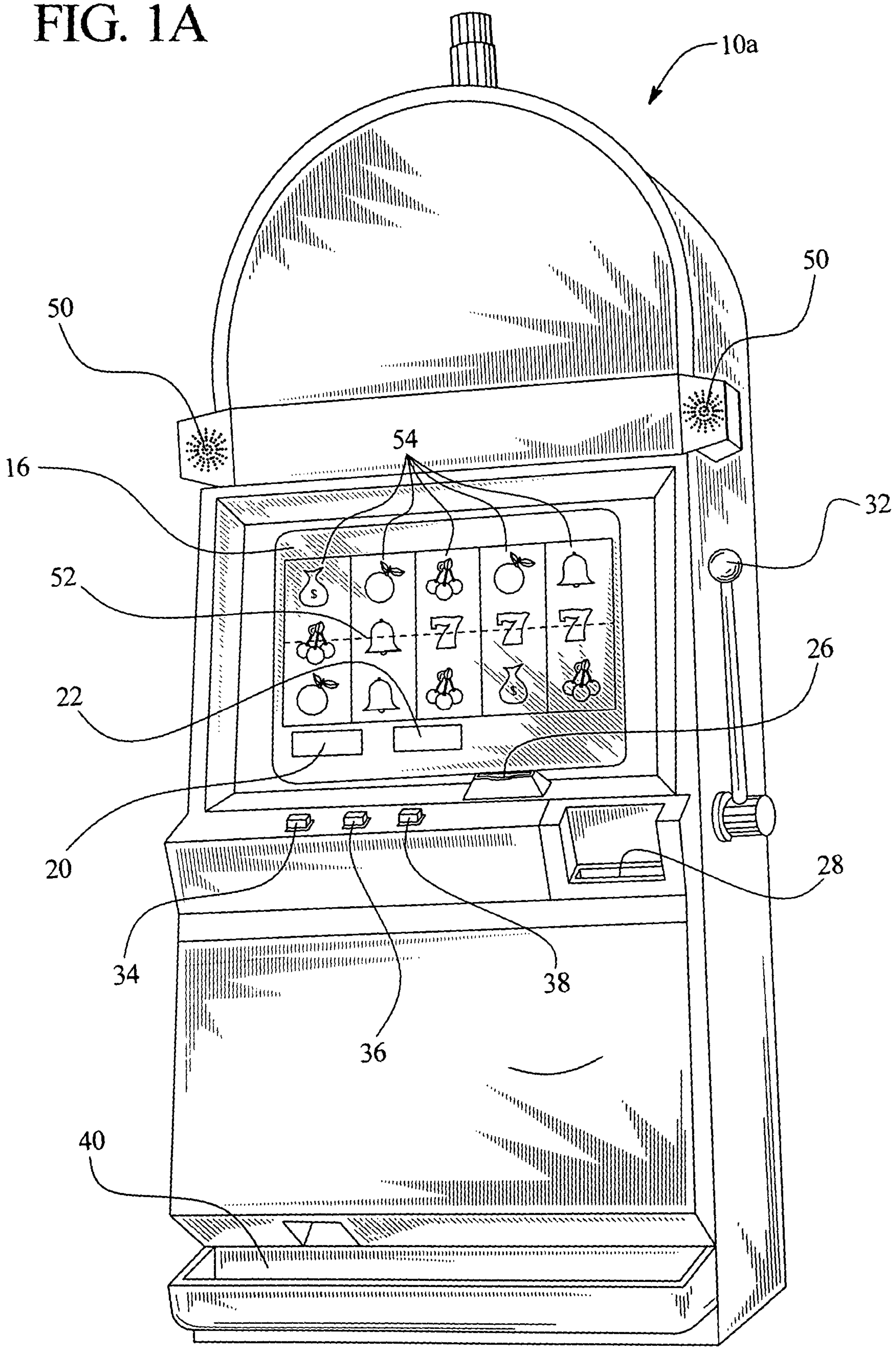
FIGS. 1A and 1B are front perspective views of various embodiments of a slot machine embodiment of the gaming device of the present invention.
Figure 1B:
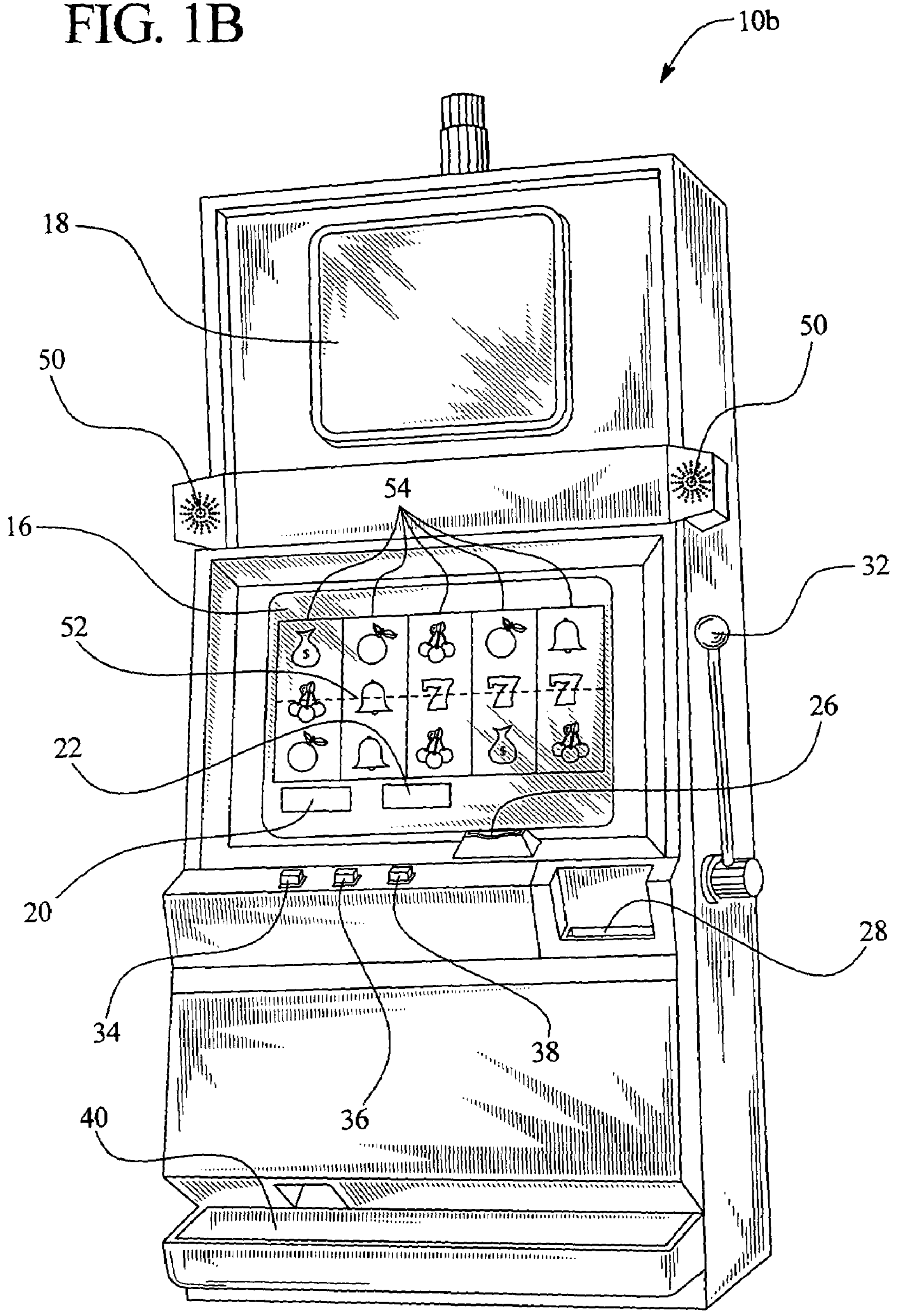

Referring now to the drawings, two alternative embodiments of the gaming device of the present invention are illustrated in FIGS. 1A and 1B as gaming device 10*a* and gaming device 10*b*, respectively. Gaming device 10*a* and/or gaming device 10*b* are generally referred to herein as gaming device 10.

In one embodiment, as illustrated in FIGS. 1A and 1B, gaming device 10 has a support structure, housing or cabinet which provides support for a plurality of displays, inputs, controls and other features of a conventional gaming machine. It is configured so that a player can operate it while standing or sitting. The gaming device may be positioned on a base or stand or can be configured as a pub-style table-top game (not shown) which a player can operate preferably while sitting. As illustrated by the different configurations shown in FIGS. 1A and 1B, the gaming device can be constructed with varying cabinet and display configurations.

Figure 2A:
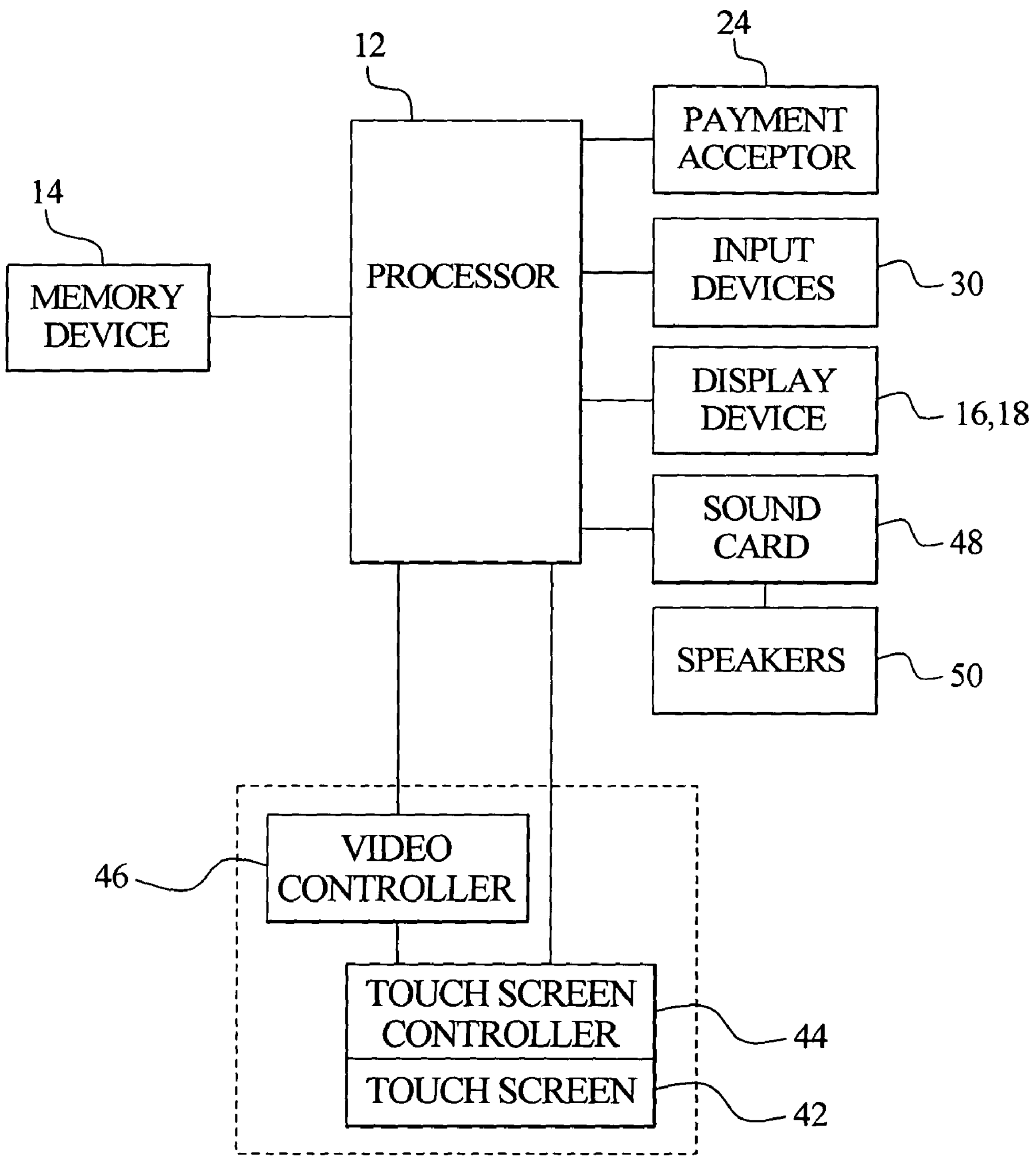
FIG. 2A is a schematic block diagram of the electronic configuration of one embodiment of the gaming device of the present invention.

In one embodiment, as illustrated in FIG. 2A, the gaming device preferably includes at least one processor 12, such as a microprocessor, a microcontroller-based platform, a suitable integrated circuit or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or other operating data, information and applicable game rules that relate to the play of the gaming device. In another embodiment, the memory device includes random access memory (RAM). In one embodiment, the memory device includes read only memory (ROM). In a further embodiment, the memory device includes flash memory and/or EEPROM (electrically erasable programmable read only memory). Any other suitable magnetic, optical and/or semiconductor memory may be implemented in conjunction with the gaming device of the present invention.

In one embodiment, part or all of the program code and/or operating data described above can be stored in a detachable or removable memory device, including, but not limited to, a suitable cartridge, disk or CD ROM. A player can use such a removable memory device in a desktop, a laptop personal computer, a personal digital assistant (PDA) or other computerized platform. The processor and memory device may be collectively referred to herein as a "computer" or "controller."

In one embodiment, as discussed in more detail below, the gaming device randomly generates awards and/or other game outcomes based on probability data. That is, each award or other game outcome is associated with a probability and the gaming device generates the award or other game outcome to be provided to the player based on the associated probabilities. In this embodiment, since the gaming device generates outcomes randomly or based upon a probability calculation, there is no certainty that the gaming device will provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device removes the provided award or other game outcome from the predetermined set or pool. Once removed from the set or pool, the specific provided award or other game outcome cannot be provided to the player again. In this type of embodiment, the gaming device provides players with all of the available awards or other game outcomes over the course of the play cycle and guarantees a designated amount of actual wins and losses.

In one embodiment, as illustrated in FIG. 2A, the gaming device includes one or more display devices controlled by the processor. The display devices are preferably connected to or mounted to the cabinet of the gaming device. The embodiment shown in FIG. 1A includes a central display device 16 which displays a primary game. This display device may also display any suitable secondary game associated with the primary game as well as information relating to the primary or secondary game. The alternative embodiment shown in FIG. 1B includes a central display device 16 and an upper display device 18. The upper display device may display the primary game, any suitable secondary game associated with the primary game and/or information relating to the primary or secondary game. As seen in FIGS. 1A and 1B, in one embodiment, the gaming device includes a credit display 20 which displays a player's current number of credits, cash, account balance or the equivalent. In one embodiment, the gaming device includes a bet display 22 which displays a player's amount wagered.

The display devices may include, without limitation, a monitor, a television display, a plasma display, a liquid crystal display (LCD), a display based on light emitting diodes (LED) or any other suitable electronic device or display mechanism. In one embodiment, as described in more detail below, the display device includes a touchscreen with an associated touchscreen controller. The display devices may be of any suitable configuration, such as a square, a rectangle or an elongated rectangle.

The display devices of the gaming device are configured to display at least one and preferably a plurality of games or other suitable images, symbols and indicia such as any visual representation or exhibition of the movement of objects such as mechanical, virtual or video reels and wheels, dynamic lighting, video images and images of people, characters, places, things and faces of cards, tournament advertisements, promotions and the like.

In one alternative embodiment, the symbols, images and indicia displayed on or by the display device may be in mechanical form. That is, the display device may include any suitable electromechanical device which preferable moves one or more mechanical objects, such as one or more mechanical rotatable wheels, reels or dice, configured to display at least one and preferably a plurality of games or other suitable images, symbols or indicia.

As illustrated in FIG. 2A, in one embodiment, the gaming device includes at least one payment acceptor 24 in communication with the processor. As seen in FIGS. 1A and 1B, the payment acceptor may include a coin slot 26 and a payment, note or bill acceptor 28, where the player inserts money, coins or tokens. The player can place coins in the coin slot or paper money, ticket or voucher into the payment, note or bill acceptor. In other embodiments, devices such as readers or validators for credit cards, debit cards, data cards or credit slips could be used for accepting payment. In one embodiment, a player may insert an identification card into a card reader of the gaming device. In one embodiment, the identification card is a smart card having a programmed microchip or a magnetic strip coded with a player's identification, credit totals and other relevant information. In one embodiment, money may be transferred to a gaming device through electronic funds transfer. When a player funds the gaming device, the processor determines the amount of funds entered and the corresponding amount is shown on the credit or other suitable display as described above.

As seen in FIGS. 1A, 1B and 2A, in one embodiment the gaming device includes at least one and preferably a plurality of input devices 30 in communication with the processor. The input devices can include any suitable device which enables the player to produce an input signal which is read by the processor. In one embodiment, after appropriate funding of the gaming device, the input device is a game activation device, such as a pull arm 32 or a play button 34 which is used by the player to start any primary game or sequence of events in the gaming device. The play button can be any suitable play activator such as a bet one button, a max bet button or a repeat the bet button. In one embodiment, upon appropriate funding, the gaming device begins the game play automatically. In another embodiment, upon the player engaging one of the play buttons, the gaming device automatically activates game play.

In one embodiment, as shown in FIGS. 1A and 1B, one input device is a bet one button 36. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game associated with the gaming device.

In one embodiment, one input device is a cash out button 38. The player may push the cash out button and cash out to receive a cash payment or other suitable form of payment corresponding to the number of remaining credits. In one embodiment, when the player cashes out, the player receives the coins or tokens in a coin payout tray 40. In one embodiment, when the player cashes out, the player may receive other payout mechanisms such as tickets or credit slips which are redeemable by a cashier or funded to the player's electronically recordable identification card.

In one embodiment, as mentioned above and seen in FIG. 2A, one input device is a touchscreen 42 coupled with a touchscreen controller 44, or some other touch-sensitive display overlay to allow for player interaction with the images on the display. The touchscreen and the touchscreen controller are connected to a video controller 46. A player can make decisions and input signals into the gaming device by touching the touchscreen at the appropriate places.

The gaming device may further include a plurality of communication ports for enabling communication of the processor with external peripherals, such as external video sources, expansion buses, game or other displays, an SCSI port or a key pad.

In one embodiment, as seen in FIG. 2A, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as playing music for the primary and/or secondary game or for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized for or to provide any appropriate information.

In one embodiment, the gaming machine may include a player or other sensor, such as a camera in communication with the processor (and possibly controlled by the processor) that is selectively positioned to acquire an image of a player actively using the gaming device and/or the surrounding area of the gaming device. In one embodiment, the camera may be configured to selectively acquire still or moving (e.g., video) images and may be configured to acquire the images in either an analog, digital or other suitable format. The display device may be configured to display the image acquired by the camera as well as display the visible manifestation of the game in split screen or picture-in-picture fashion. For example, the camera may acquire an image of the player and that image can be incorporated into the primary and/or secondary game as a game image, symbol or indicia.

The gaming device can incorporate any suitable wagering primary or base game. The gaming machine or device of the present invention may include some or all of the features of conventional gaming machines or devices. The primary or base game may comprise any suitable reel-type game, card game, number game or other game of chance susceptible to representation in an electronic or electromechanical form which produces a random outcome based on probability data upon activation of the game from a wager made by the player. That is, different primary wagering games, such as video poker games, video blackjack games, video keno, video bingo or any other suitable primary or base game may be implemented into the present invention.

In one embodiment, as illustrated in FIGS. 1A and 1B, a base or primary game may be a slot game with one or more paylines 52. The paylines may be horizontal, vertical, circular, diagonal, angled or any combination thereof. In this embodiment, the gaming device displays at least one reel and preferably a plurality of reels 54, such as three to five reels, in either electromechanical form with mechanical rotating reels or in video form with simulated reels and movement thereof. In one embodiment, an electromechanical slot machine includes a plurality of adjacent, rotatable wheels which may be combined and operably coupled with an electronic display of any suitable type. In another embodiment, if the reels are in video form, the plurality of simulated video reels are displayed on one or more of the display devices as described above. Each reel displays a plurality of indicia such as bells, hearts, fruits, numbers, letters, bars or other images which preferably correspond to a theme associated with the gaming device. In this embodiment, the gaming device awards prizes when the reels of the primary game stop spinning if specified types and/or configurations of indicia or symbols occur on an active pay line or otherwise occur in a winning combination or patter.

In one embodiment, a base or primary game may be a poker game wherein the gaming device enables the player to play a conventional game of video poker and initially deals five cards, all face up, from a virtual deck of fifty-two cards. Cards may be dealt as in a traditional game of cards or in the case of the gaming device, the cards may be randomly selected from a predetermined number of cards. If the player wishes to draw, the player selects the cards to hold by using one or more input devices, such as pressing related hold buttons or touching a corresponding area on a touchscreen. After the player presses the deal button, the processor of the gaming device removes the unwanted or discarded cards from the display and deals replacement cards from the remaining cards in the deck. This results in a final five-card hand. The processor of the gaming device compares the final five-card hand to a payout table which utilizes conventional poker hand rankings to determine the winning hands. Award based on a winning hand and the credits wagered is provided to the player.

In another embodiment, the base or primary game may be a multi-hand version of video poker. In this embodiment, the player is dealt at least two hands of cards. In one such embodiment, the cards in all of the dealt hands are the same cards. In one embodiment each hand of cards is associated with its own deck of cards. The player chooses the cards to hold in a primary hand. The held cards in the primary hand are also held in the other hands of cards. The remaining non-held cards are removed from each displayed hand and replaced with randomly dealt cards. Since the replacement cards are randomly dealt independently for each hand, the replacement cards will usually be different for each hand. The poker hand rankings are then determined hand by hand and awards are provided to the player.

In one embodiment, a base or primary game may be a keno game wherein the gaming device displays a plurality of selectable indicia or numbers on at least one of the display devices. In this embodiment, the player selects at least one and preferably a plurality of the selectable indicia or numbers by using an input device or by using the touchscreen. The gaming device then displays a series of drawn numbers to determine an amount of matches, if any, between the player's selected numbers and the gaming device's drawn numbers. The player is provided an award, if any, based on the amount of determined matches.

In one embodiment, in addition to winning credits in a base or primary game, the gaming device may also give players the opportunity to win credits in a bonus or secondary game or bonus or secondary round. The bonus or secondary game enables the player to obtain a bonus prize or payout in addition to the prize or payout, if any, obtained from the base or primary game. In general, a bonus or secondary game produces a significantly higher level of player excitement than the base or primary game because it provides a greater expectation of winning than the base or primary game and is accompanied with more attractive or unusual features than the base or primary game.

In one embodiment, the bonus or secondary game may be any type of suitable game, either similar to or completely different from the base or primary game. In one embodiment, the gaming device includes a program code which causes the processor to automatically begin a bonus round when the player has achieved a triggering event, a qualifying condition or other designated game event in the base or primary game. In one embodiment, the triggering event or qualifying condition may be a selected outcome in the primary game or a particular arrangement of one or more indicia on a display device in the primary game, such as the number seven appearing on three adjacent reels along a payline in the primary slot game embodiment seen in FIGS. 1A and 1B. In another embodiment, the triggering event or qualifying condition may be triggered by exceeding a certain amount of game play (number of games, number of credits, amount of time), earning a specified number of points during game play or as a random award.

In one embodiment, once a player has qualified for a bonus game, the player may subsequently enhance their bonus game participation by returning to the base or primary game for continued play. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple bonus qualifying events in the primary game may result in an arithmetic or geometric increase in the number of bonus wagering credits awarded. In one embodiment, extra bonus wagering credits may be redeemed during the bonus game to extend play of the bonus game.

In one embodiment, no separate entry fee or buy in for a bonus game need be employed. That is, a player may not purchase an entry into a bonus game. The player must win or earn entry through play of the primary game, thereby encouraging play of the primary game. In another embodiment, qualification of the bonus or secondary game could be accomplished through a simple "buy in" by the player if, for example, the player has been unsuccessful at qualifying for the bonus game through other specified activities.

Figure 2B:
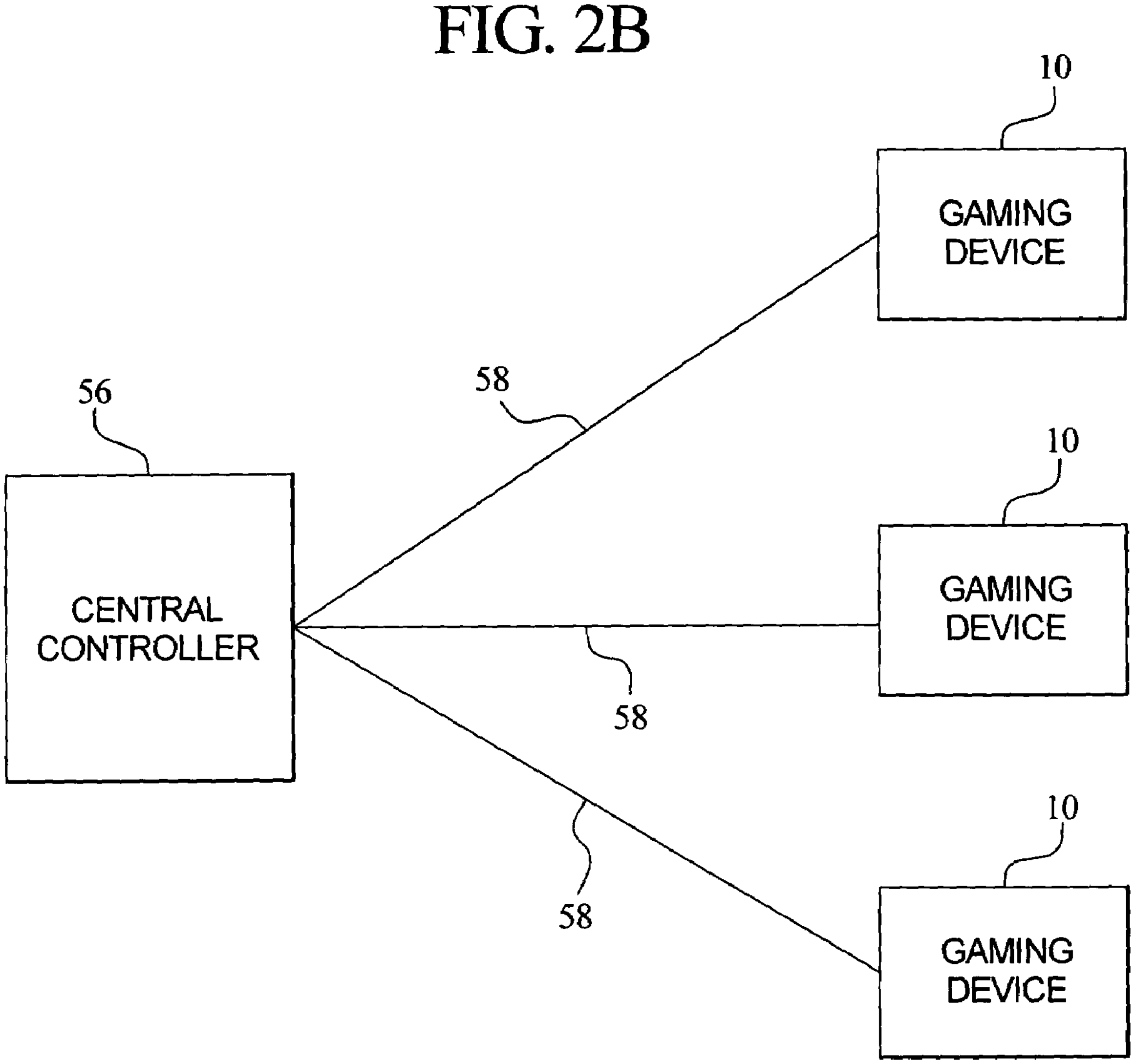
FIG. 2B is a schematic block diagram of various gaming devices employing the wagering game of the present invention, wherein the devices are networked to a central controller.

In one embodiment, as illustrated in FIG. 2B, one or more of the gaming devices 10 of the present invention may be connected to a data network or a remote communication link 58 with some or all of the functions of each gaming device provided at a central location such as a central server or central controller 56. More specifically, the processor of each gaming device may be designed to facilitate transmission of signals between the individual gaming device and the central server or controller.

In one embodiment, the game outcome provided to the player is determined by a central server or controller and provided to the player at the gaming device of the present invention. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such a free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and/or preventing cheating or electronic or other errors, reducing or eliminating win-loss volatility and the like.

In another embodiment, one or more of the gaming devices of the present invention are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or an on-line accounting and gaming information system operably coupled to the central server or controller. The accounting and gaming information system of this embodiment includes a player database for storing player profiles, a player tracking module for tracking players and a credit system for providing automated casino transactions.

A plurality of the gaming devices of the present invention are capable of being connected to a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system of the present invention may be substantially identical to the LAN gaming system described above, although the number of gaming devices in each system may vary relative to each other.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server or webserver) through a conventional phone or other data transmission line, digital signal line (DSL), T-1 line, coaxial cable, fiber optic cable, wireless gateway or other suitable connection. In this embodiment, players may access an internet game page from any location where an internet connection and computer, or other internet facilitator are available. The expansion in the number of computers and number and speed of internet connections in recent years increases opportunities for players to play from an ever-increasing number of remote sites. It should be appreciated that enhanced bandwidth of digital wireless communications may render such technology suitable for some or all communications according to the present invention, particularly if such communications are encrypted. Higher data transmission speeds may be useful for enhancing the sophistication and response of the display and interaction with the player.

In another embodiment, a plurality of gaming devices at one or more gaming sites may be networked to a central server in a progressive configuration, as known in the art, wherein a portion of each wager to initiate a base or primary game may be allocated to bonus or secondary event awards. In one embodiment, a host site computer is coupled to a plurality of the central servers at a variety of mutually remote gaming sites for providing a multi-site linked progressive automated gaming system. In one embodiment, a host site computer may serve gaming devices distributed throughout a number of properties at different geographical locations including, for example, different locations within a city or different cities within a state.

In one embodiment, the host site computer is maintained for the overall operation and control of the system. In this embodiment, a host site computer oversees the entire progressive gaming system and is the master for computing all progressive jackpots. All participating gaming sites report to, and receive information from, the host site computer. Each central server computer is responsible for all data communication between the gaming device hardware and software and the host site computer.

Game Play

Referring now to FIGS. 3 to 21, one embodiment of the present invention is illustrated. In one implementation, the game is played on one of the video monitors 16 or 18 described above. In another implementation, the games described herein are played on a small monitor or screen of a handheld gaming device. Still further, the game is alternatively downloaded to and played on a video monitor of a personal computer. The game may alternatively be played on a physical game board. In each case, the game displayed includes a game board 70 that defines a plurality of spaces or positions 72.

In one preferred embodiment, the positions 72 form multiple rows and columns. The known Othello® game includes an eight by eight grid or board. The board 70 is instead a six by six board. It should be appreciated that any of the embodiments described herein could be played alternatively on an eight by eight or larger grid or a grid smaller than six by six. In further alternative embodiments, positions 72 are not displayed in a grid but instead in other groupings, wherein at one time a line can be drawn through only a single position of each grouping.

Information 74 concerning the game is displayed above the grid 70 of each FIGS. 3 to 21. Information 74 includes the number of game piece placements remaining for the black game pieces 76 and the white game pieces 78. Information 74, for example in FIG. 3, indicates that both the black and white game pieces have two remaining chip placements. Except where otherwise stated herein, the black game pieces 76 represent the gaming device 10 or processor 12, while the white game pieces 78 represent the player. In alternative embodiments discussed below, the black game pieces 76 alternatively represent a second player or the player's opponent's chips.

Information 74 also tracks the various decisions made by either the gaming device 10 or processor 12 or the player 80 and the outcomes therefrom. FIGS. 3 to 21 will ultimately trace of the total possible outcomes of the game of the present invention. The data derived from those figures or otherwise, it will be shown, can be placed in tables or data compilations. The data collected can likewise be entered into the memory device 14 and retrieved and used by processor 12 to make decisions based on and in response to a player's decision. In that manner, gaming device 10 does not play against the player blindly but instead makes decisions that tend to guide the final outcome to a desired destination, e.g., to a particular award or number of remaining game pieces. Multiple data tables can also be entered in memory device 14 that provide for different difficulty levels. That is, certain databases can be employed and used selectively to make it easier or harder to collect chips. In one embodiment, all of the possible game scenarios are stored in the data tables, so that an outcome in the range of suitable outcomes can always be obtained or provided to the player.

Figure 3:
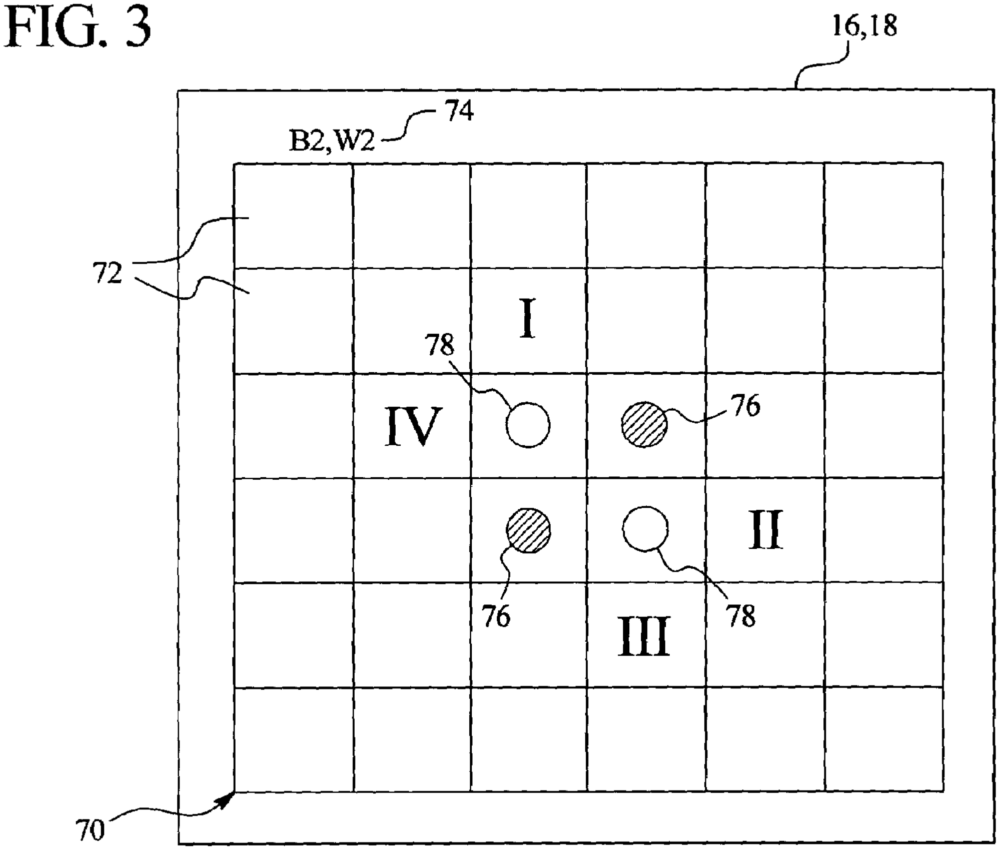
FIGS. 3, 4, 5, 6, 7, 8, 9, 10, 11, 12, 13, 14, 15, 16, 17, 18, 19, 20 and 21 illustrate multiple possible outcomes for the game piece switching game of the present invention.

In one embodiment, the game sets up an initial screen shown initially in FIG. 3, wherein two of each of the game pieces 76 and 78 are provided initially in the middle of grid 70, in an alternating format. The placement ensures that neither the black or white chips can be totally eliminated on the first move. Message 74 in FIG. 3 indicates that both the black and white game pieces, i.e., the game and player, respectively, have two remaining game piece placements.

As with known the Othello® game, the dark or black game pieces make the first move. In the illustrated embodiment, therefore, the gaming device 10 or processor 12 moves first. Positions 72 marked by Roman numerals I to IV show the four possible positions that gaming device 10 can choose. Each of the positions it should be appreciated surrounds one of the player pieces 78 in combination with an existing gaming device piece 76.

The grid 70 is initially perfectly symmetrical from the standpoint that the game chips 76 and player chips 78 are located in the center of grid 70 and are alternated diagonally from one another. It should therefore be understood by those of skill in the art that the total possible outcomes after choosing Roman numeral I are the same as or are symmetrical to the total possible outcomes from choosing II, III and IV. Thus, by analyzing the outcomes from the selection of any one of the Roman numeral I to IV selections, the results obtained therefrom are applicable to any of the roman numeral selections.

One goal of the present invention is to provide a game that appears to require skill by the player, which in turn is fun and exciting to play, but in which the outcome is substantially independent of the player's choices. Gaming device 10 cannot control the positions 72 the player chooses. Gaming device 10 can however adapt its choices based on choices made by the player. FIGS. 3 to 21 illustrate one embodiment of how that is accomplished.

It should be appreciated that at the stage of the game in FIG. 3, wherein gaming device 10 makes the first move, and the grid 70 is perfectly symmetrical as described above. It does not matter which position 72, Roman numerals I to IV, that gaming device 10 chooses. In other words, gaming device 10 can weight each selection equally at 25 percent.

Figure 4:
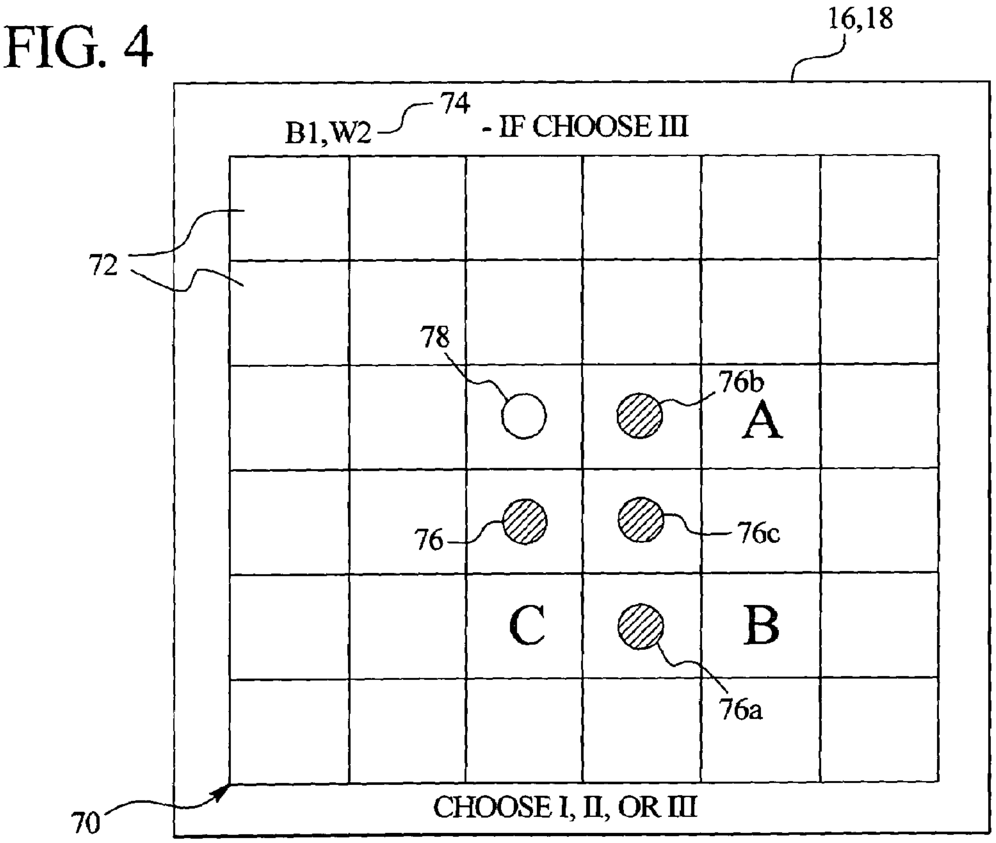

Comparing FIGS. 3 and 4, it becomes clear that gaming device 10 has placed a chip 76*a* on the position 72 shown by Roman numeral III in FIG. 3 (alphanumeric gaming device chips collectively referred to herein as chips 76). The initial game chip 76*a* in combination with game chip 76*b* surround opposite sides of player chip 78 illustrated in FIG. 3, thereby converting that player chip to a game chip 76*c* in FIG. 4. Message 74 in FIG. 4 indicates that the grid 70 appears in the illustrated manner when gaming device has a single remaining pick, the player has two remaining picks and the gaming device has chosen first the Roman III selection. Grid 70 also illustrates now the player's possible rebuttal picks, set forth by capital letters A to C. The positions 72 highlighted by letters A to C are the only positions on board 70 that in combination with the single remaining player chip 78 will if chosen surround a game chip 76.

Figure 5:
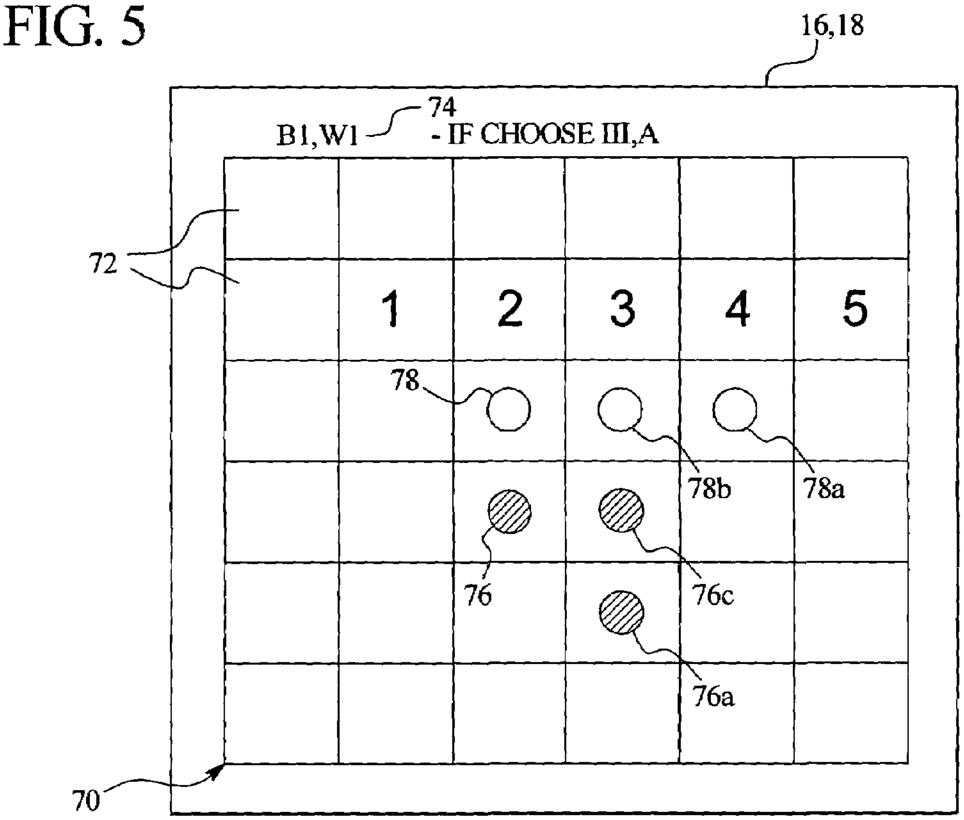
Figure 6:
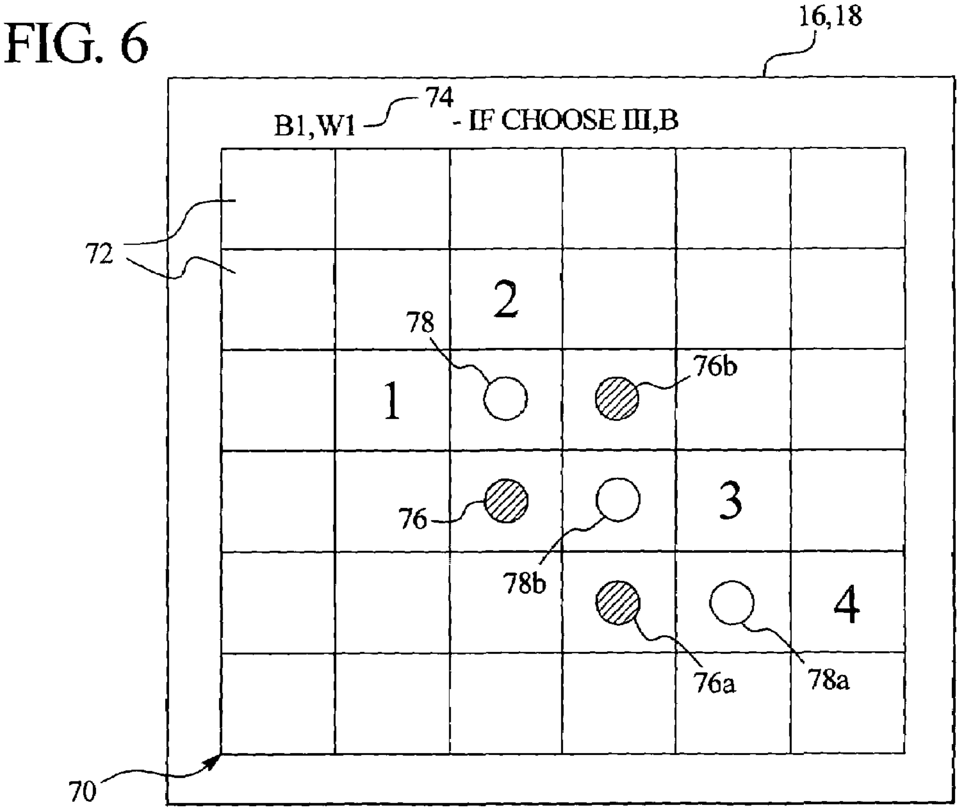
Figure 7:
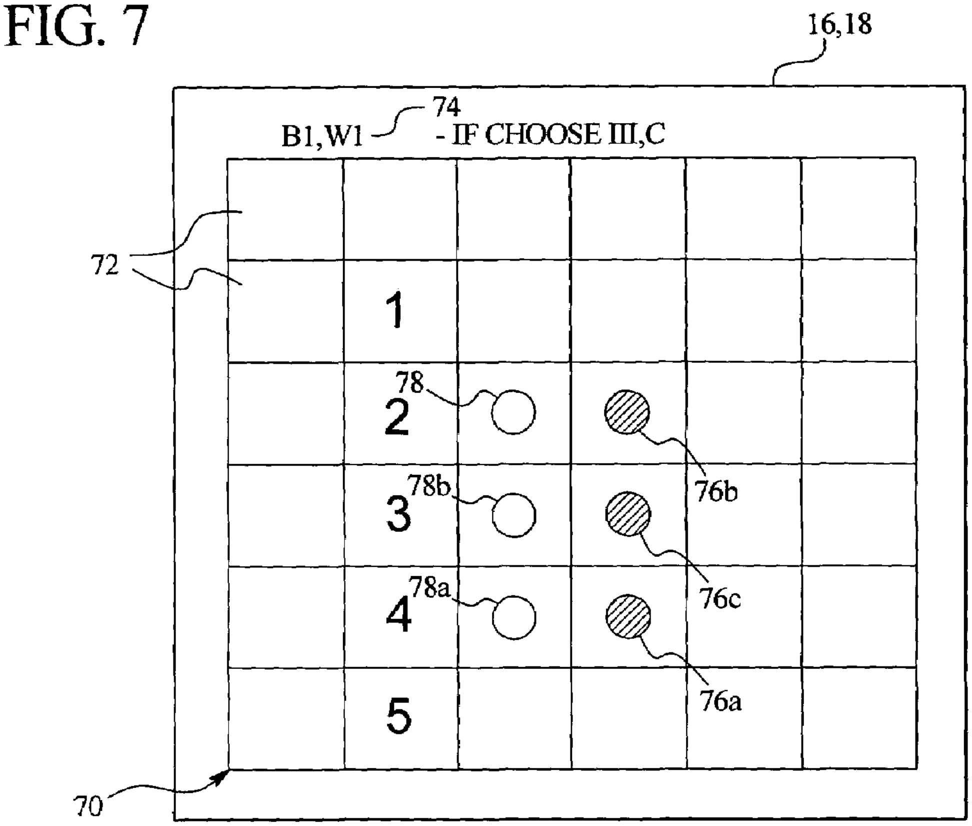

Referring now to FIGS. 5 to 7, each of the possible outcomes from the player's selection of one of the letters A to C from the grid 70 of FIG. 4 are illustrated respectively. In particular, message 74 of FIG. 5 indicates that the grid 70 is the outcome of game choice III and player choice A, wherein the game and the player each have one remaining chip placement. Message 74 of FIG. 6 illustrates that the grid 70 displays the outcome of game choice III and player choice B. Message 74 of FIG. 7 indicates that grid 70 of that figure is the outcome of game choice III and player choice C, wherein the game and player each have one remaining game piece placement.

In FIG. 5, the player places player chip 78*a* on position 72 shown previously in FIG. 4 by letter A. Player chip 78*a* in combination with original player chip 78 convert game chip 76*b* of FIG. 4 to player chip 78*b* in FIG. 5 (alphanumeric player chips referred to herein collectively as player chips 78).

FIG. 6 illustrates that player chip 78*a* is instead placed on position 72 formerly highlighted by letter B of FIG. 4, which in combination with original player chip 78 converts former game chip 76*c* into player chip 78*b* on FIG. 6. In FIG. 7, the player alternatively places player chip 76*a* on position 72 formerly highlighted by letter C of FIG. 4, which in combination with original player chip 78, converts former original game chip 76 of FIG. 4 into player chip 78*c* in FIG. 7.

In FIGS. 5 to 7, Arabic numbers show the possible choices that the processor 12 of gaming device 10 can make to counteract the player's first pick. FIG. 5 illustrates five possible game selections 1 to 5 in a horizontal row. FIG. 6 illustrates four possible game selections 1 to 4, which are scattered about grid 70. FIG. 7 illustrates five possible game selections 1 to 5 shown in a vertical column.

Unlike the first game pick, the game's second and last pick will lead to asymmetrical results between the outcomes from FIG. 5 versus the outcomes from FIG. 6 and from FIG. 7. That is, the game's selection in FIG. 3 does not effect the overall average number of chips that the player ultimately has remaining when all player and game picks are exhausted. On the other hand, within any one of the grids of FIGS. 5 to 7, the game's selection of one of the Arabic numerals effects in most cases the average number of player chips remaining at the end of the game. It is therefore an objective of the present invention to determine which game selections can ultimately lead to a higher or lower average number of player picks remaining, wherein the game choices can be weighted accordingly.

Figure 8:
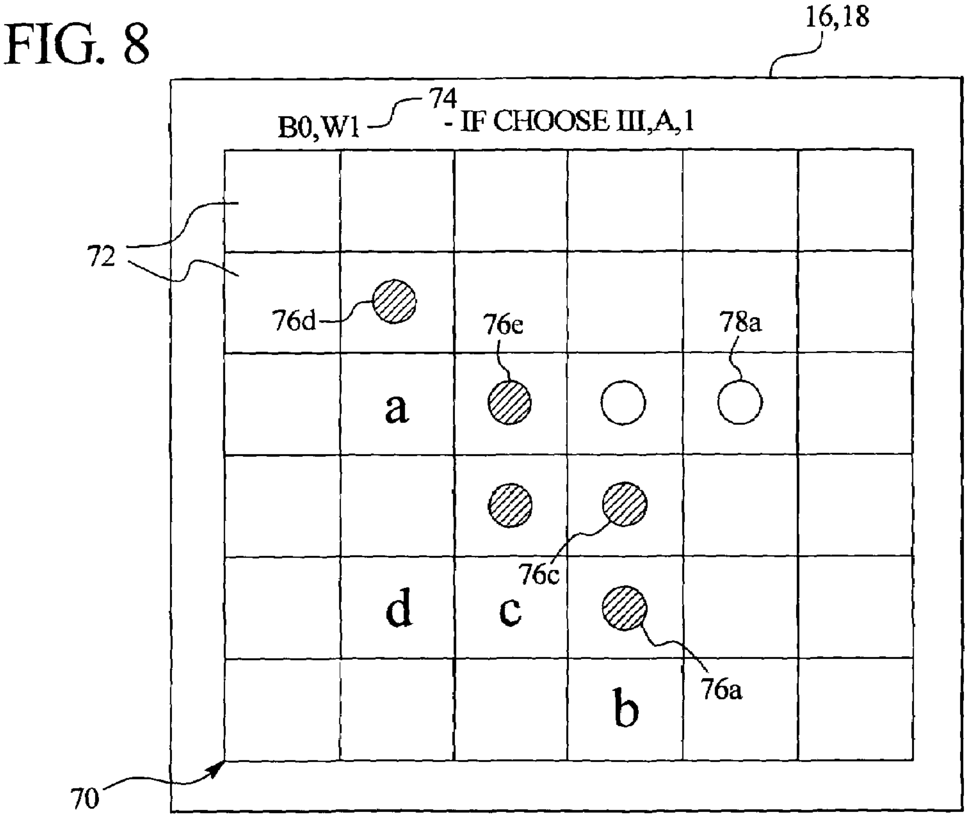
Figure 9:
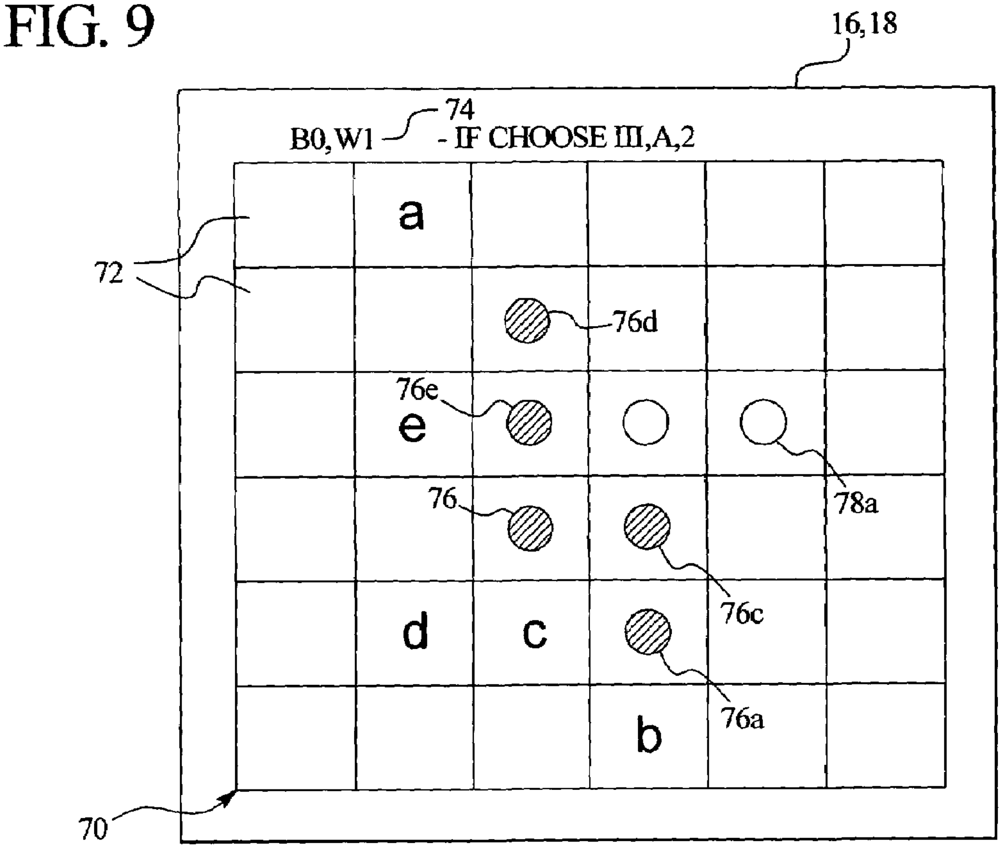
Figure 10:
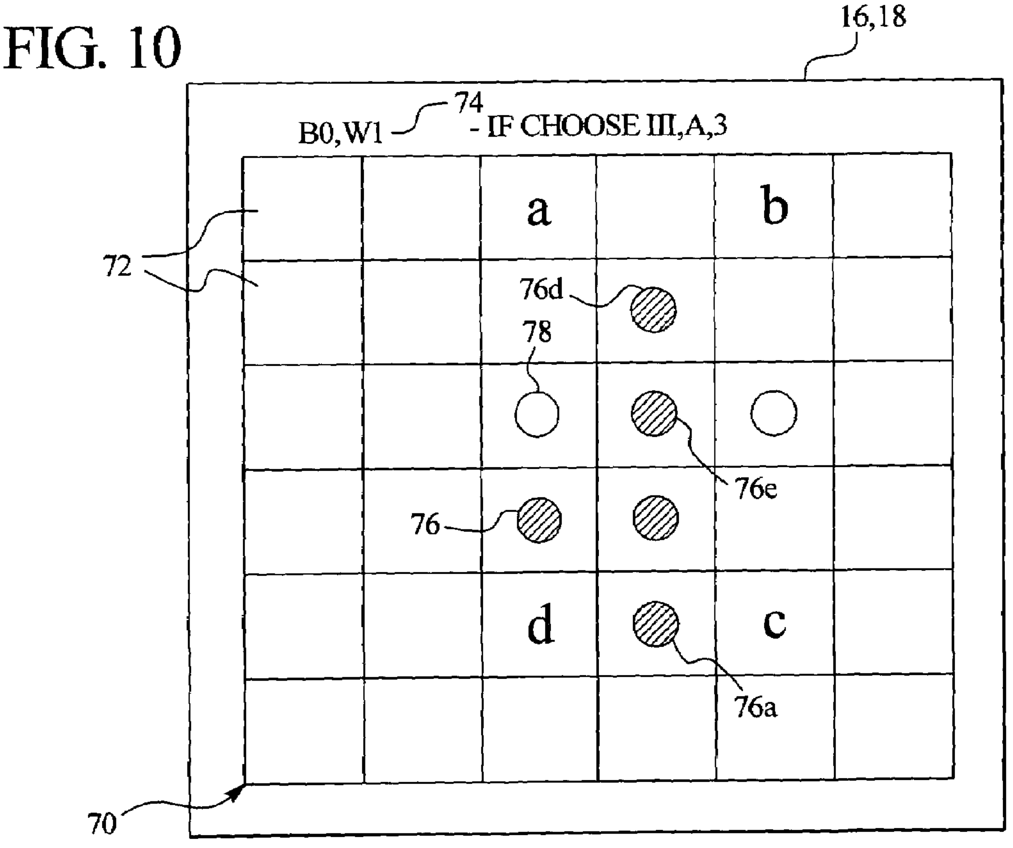
Figure 11:
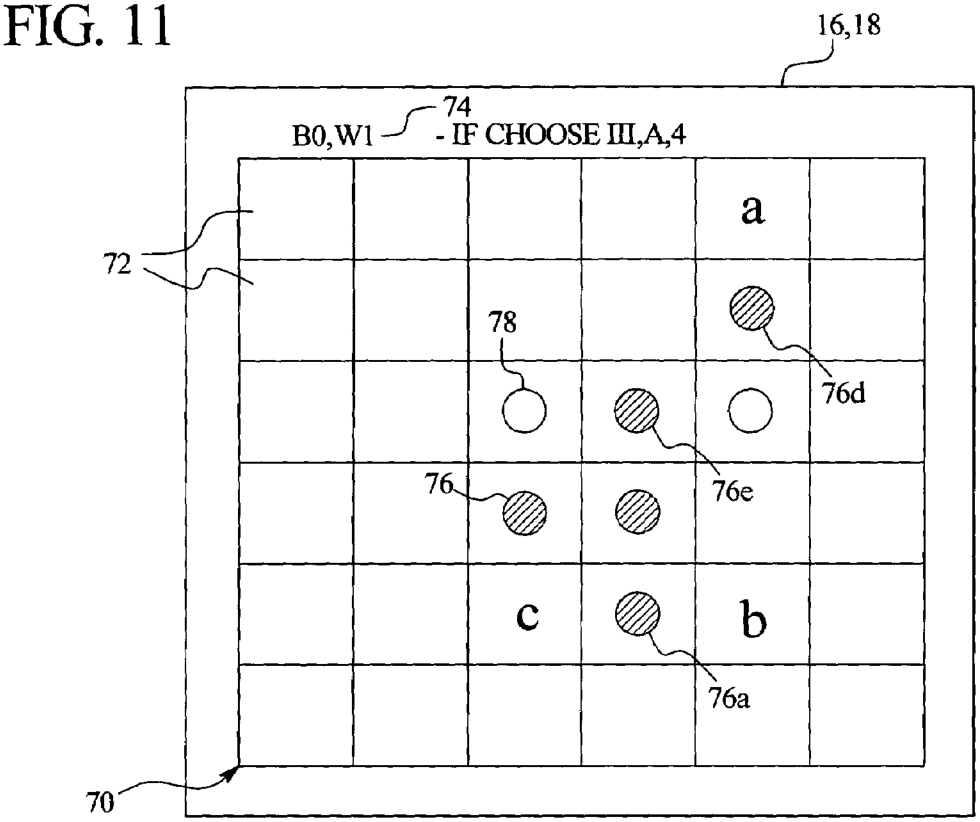
Figure 12:
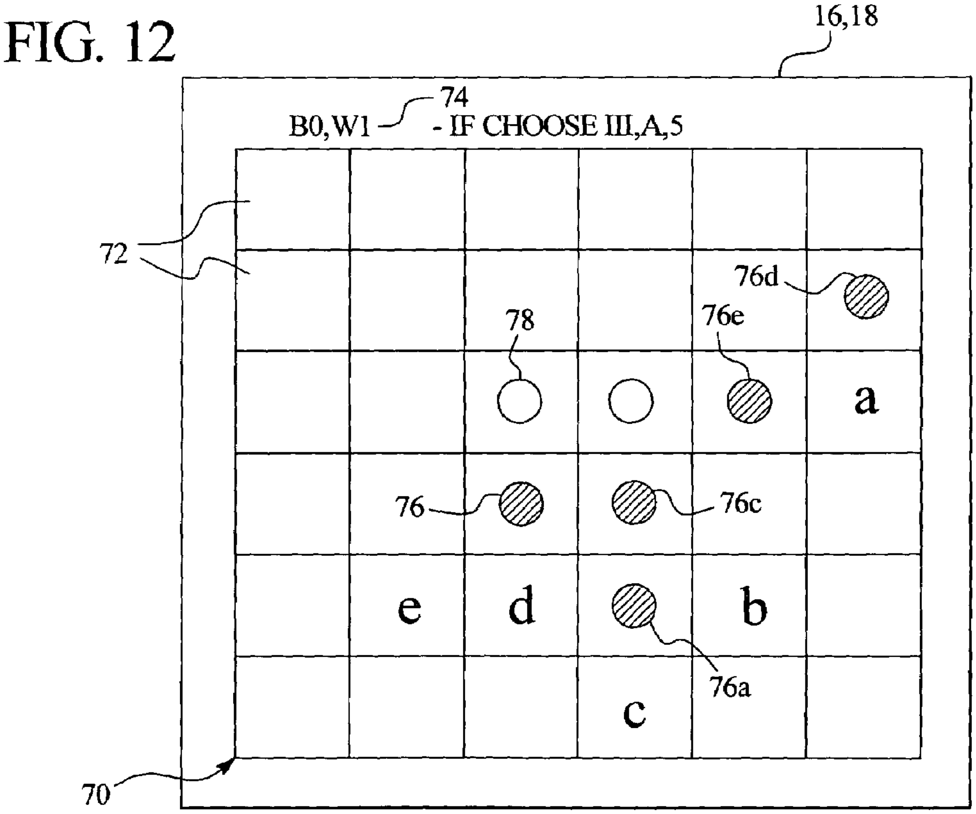

FIGS. 8 to 12 show each of the possible outcomes from grid 70 of FIG. 5. In particular, message 74 of FIG. 8 indicates that screen 70 shows the outcome of game choice III in FIG. 3, player choice A in FIG. 4 and game choice 1 in FIG. 5. Message 74 of FIG. 9 indicates that grid 70 shows the outcome of game choice III in FIG. 3, player choice A in FIG. 4 and game choice 2 in FIG. 5. In a similar manner, messages 74 of FIGS. 10 to 12 illustrate the respective grids 70 showing the outcomes of game choice III in FIG. 3, player choice A in FIG. 4 and game choices 3 to 5, respectively in FIGS. 10 to 12.

In FIG. 8, the game choice of Arabic numeral 1 placed game chip 76*d*, converting former original player chip 78 and producing converted game chip 76*e*. In FIG. 9, the game choice of II placed game chip 76*d*, converting former original player chip 78 and creating converted game chip 76*e*. In FIG. 10, the game's choice of Arabic numeral 3 placed game choice 76*d*, creating converted game chip 76*e*. In FIG. 11, the game's choice of Arabic numeral 4 placed game chip 76*d*, creating converted game chip 76*e*. In FIG. 12, the game's choice of Arabic numeral 5 placed game chip 76*d*, creating converted game chip 76*e*.

The game's choice of one of the Arabic numbers 1 to 5 exhausts the game's final pick. Each of FIGS. 8 to 12 also shows lowercase letters, which represent the possible positions for the player's final chip placement. FIG. 8 shows lowercase letters a to d. FIG. 9 shows lowercase letters a to e. FIG. 10 shows lowercase letters a to d. FIG. 11 shows lowercase letters a to c. FIG. 12 shows lowercase letters a to e. Each of those letters marks a position that the player could choose to utilize the player's last pick. Those positions are, as illustrated, dependent upon the previous choice of one of the Arabic numerals that the game makes. The lowercase letter positions are the last possible player placements in the illustrated embodiments. Other embodiments contemplated herein have three or more choices provided to the game and player. For illustration purposes, it is sufficient to show only two. FIGS. 8 to 12 map out a complete portion of the overall combinations available from the game's choice of the III position in FIG. 3 and player's choice of the A position in FIG. 4, as mapped out in FIG. 5.

FIG. 25 illustrates the possible outcomes from the players final pick in FIGS. 8 to 12. As seen in FIG. 25 for FIG. 8, the player receives five chips for a final placement on the b position and four chips for a, c and d positions. For FIG. 9, the player receives five chips for a final placement on the b position and four chips for a, c, d and e position placements. For FIG. 12, the player receives five chips for a final c position placement and four chips for the remaining positions. For FIGS. 10 and 11, the player receives four chips regardless of where the player places the final chip.

Figure 13:
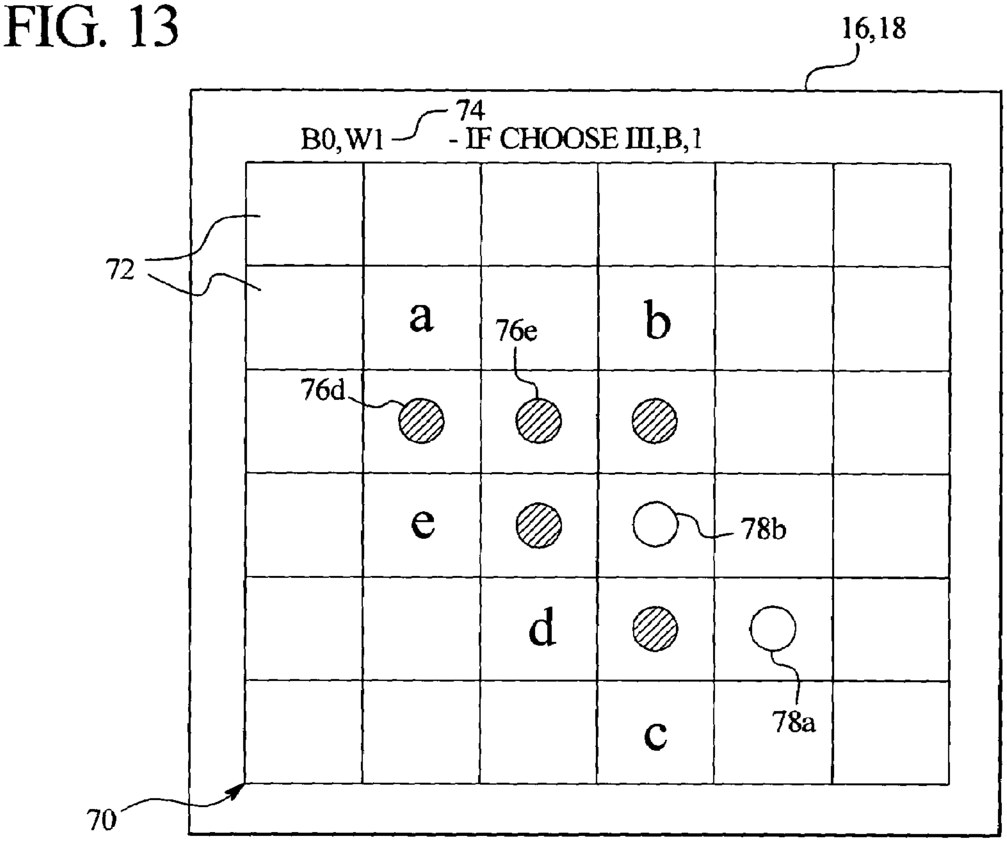
Figure 14:
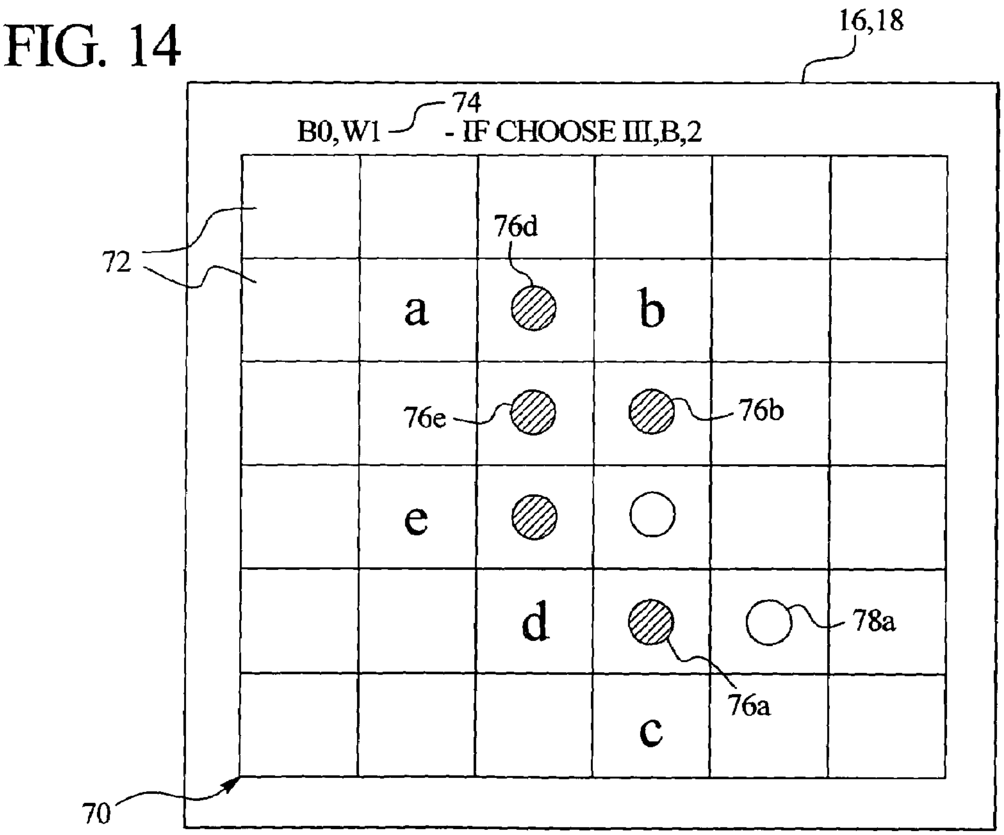
Figure 15:
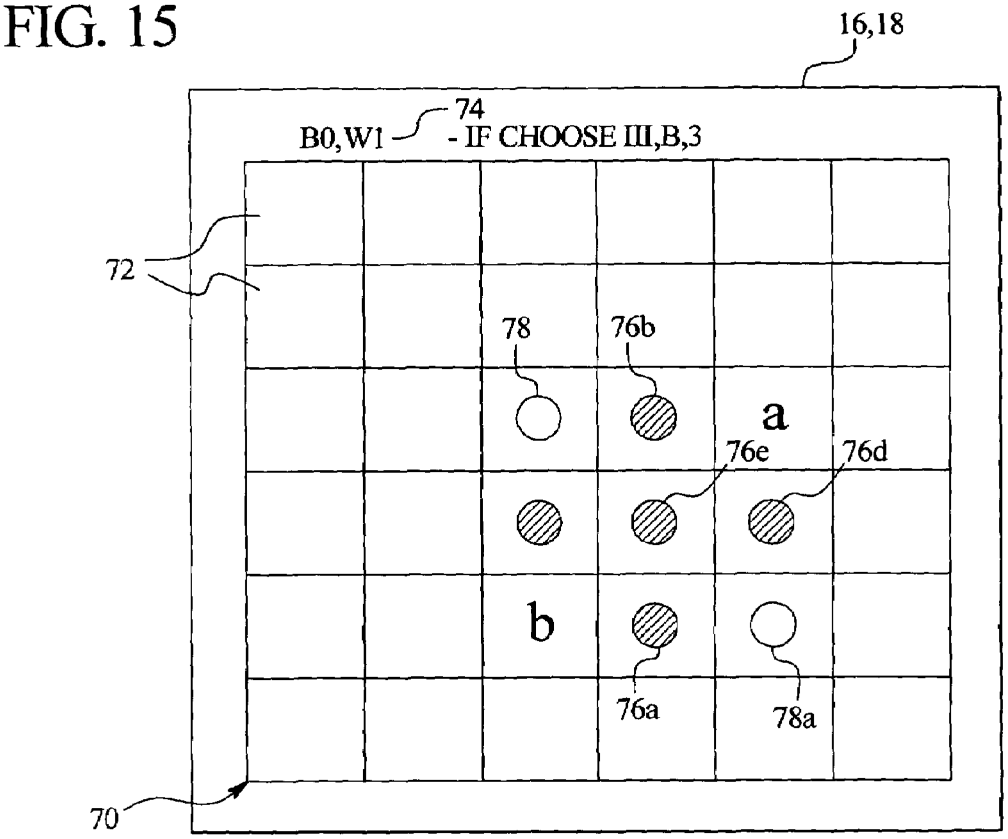
Figure 16:
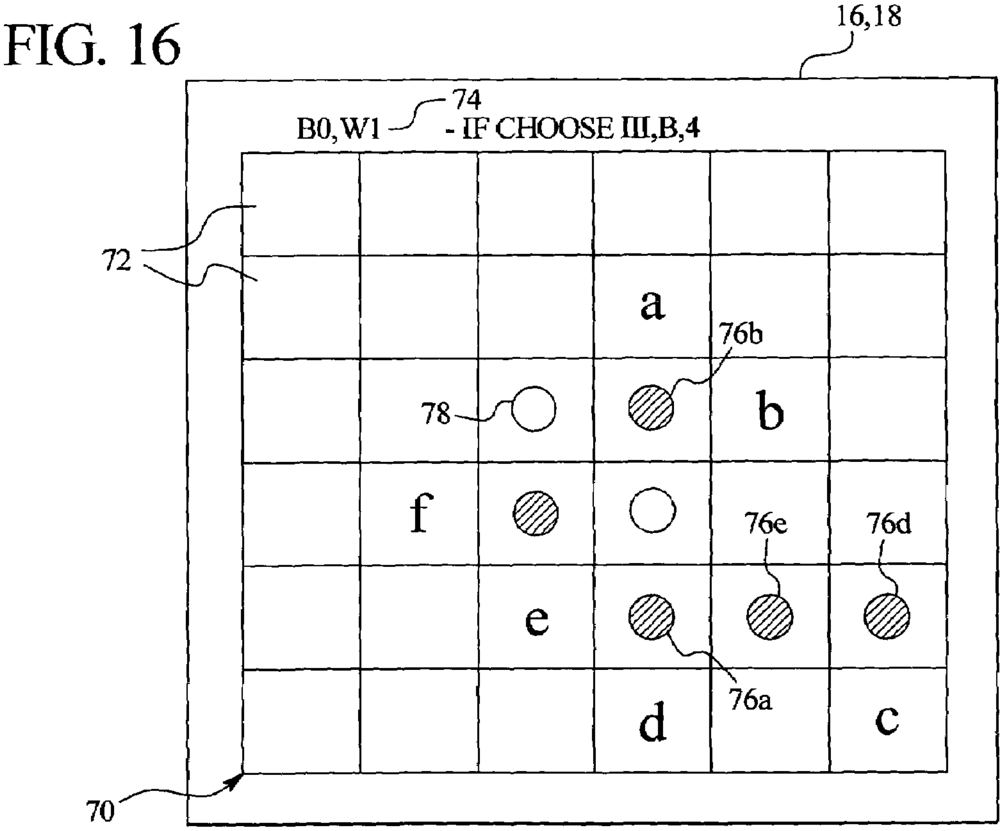
Figure 17:
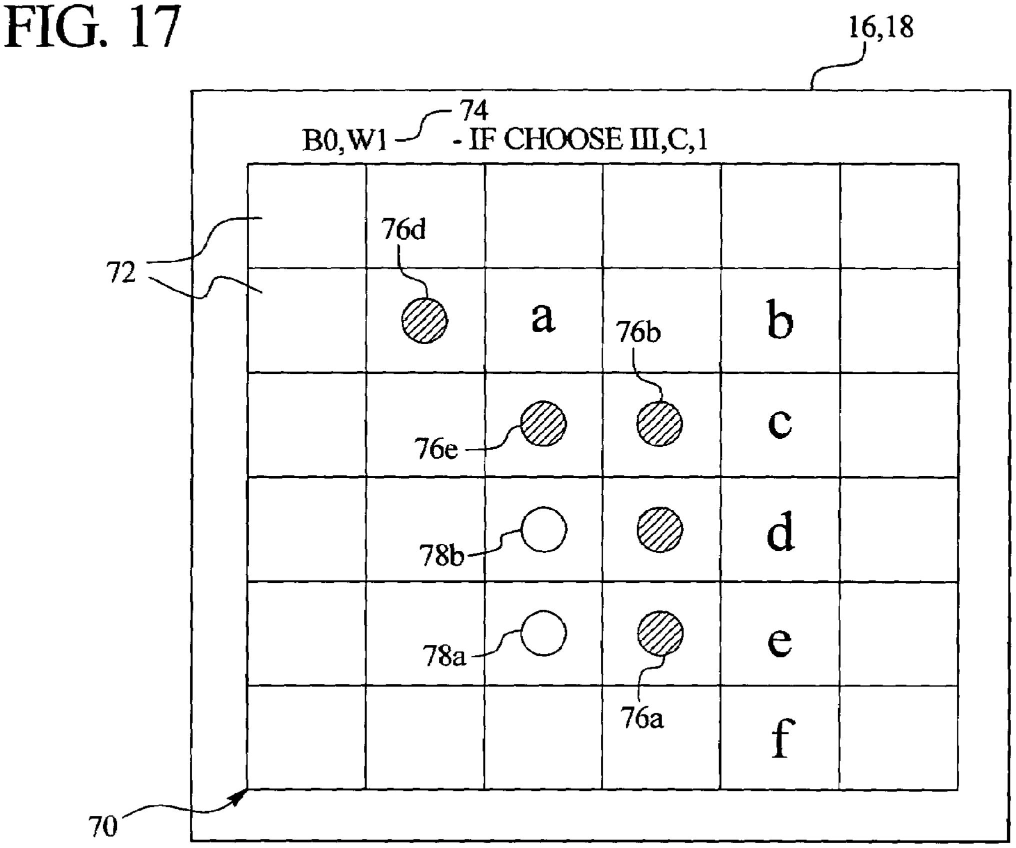

In a similar manner, FIGS. 13 to 16 illustrate the possible game outcomes of the four game selections in 1 to 4 FIG. 6, which are each outcomes of the player's choice of the B position in FIG. 4. In particular, message 74 of FIG. 13 indicates that gaming device 10 has used its last selection on Arabic numeral 1 in FIG. 6. Message 74 of FIG. 14 illustrates that gaming device 10 has used its last pick on Arabic numeral 2 as shown in FIG. 6. Message 74 of FIG. 15 illustrates that gaming device 10 has used its last selection on Arabic numeral 3 as seen in FIG. 6. Message 74 of FIG. 16 illustrates that gaming device 10 has used its last selection on Arabic numeral 4 as seen in FIG. 6.

In each of the FIGS. 13 to 16, the game chip **76*d* indicates the game chip that has been placed onto grid 70 by the game's final chip placement. The game chip 76*e*** indicates a chip that has been converted via the placement from a player chip to a game chip.

In each of FIGS. 13 to 16, the positions 72 available for the player's final pick are indicated by lowercase letters. FIGS. 13, 14 and 16 illustrate the five possible positions a to e available for the player's final pick. FIG. 15 on the other hand provides only two possible positions 72 of a and b for the player. FIGS. 13 to 16 it should be appreciated exhaust all the possibilities extending from game selection III in FIG. 3, player selection B in FIG. 4, which result in grid 70 of FIG. 6. FIG. 26, which summarizes the possible outcomes for FIGS. 13 to 16 shows that FIGS. 13, 14 and 16 always result in four chips for the player, while FIG. 15 results always in five chips for the player. Here, the processor's play effects which figure or grid 70 from which the player chooses, but the player's choice in any one of the grids does not effect the overall number of remaining player chips, eliminating skill as a factor.

FIGS. 17 to 21 likewise illustrate the game possibilities set forth in grid 70 of FIG. 7, which is a result of game pick III in FIG. 3 and the player's pick of C position in FIG. 4. In particular, message 74 of FIG. 17 indicates that the game's last pick was the Arabic numeral 1 in FIG. 7. Message 74 of FIG. 18 indicates that the game used its last pick on position 2 in FIG. 7. Message 74 of FIG. 19 indicates that gaming device 10 used its final pick on position 3 in FIG. 7. Message 74 indicates that gaming device 10 used its last selection on position 4 in FIG. 7. Message 74 of FIG. 21 indicates that gaming device 10 used its final selection on position 5 of FIG. 7.

As before, the game chip **76*d* in each of the FIGS. 17 to 21 highlights the game chip that has been placed onto grid 70 by the game's placement of its last chip. Game chip 76*e* in those figures is a game chip that has resulted from a conversion of a former player chip that has been bound or captured between two game chips due to the placement of chip 76*d*.**

Figure 18:
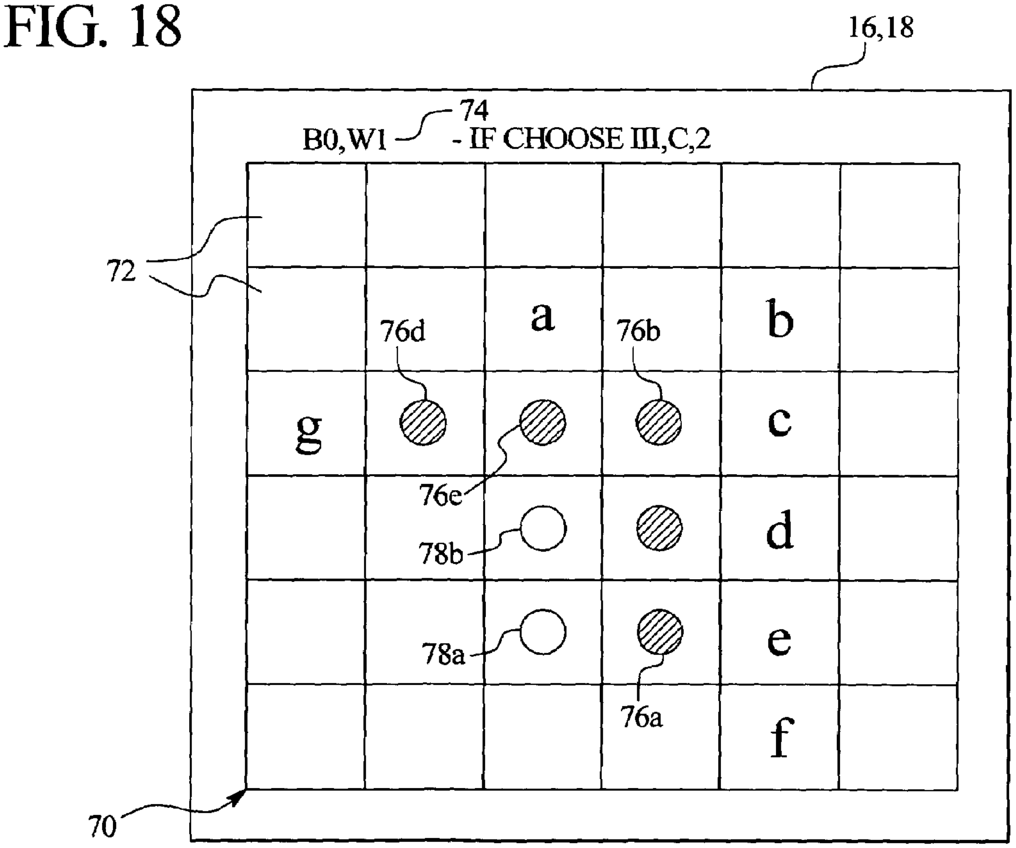
Figure 19:
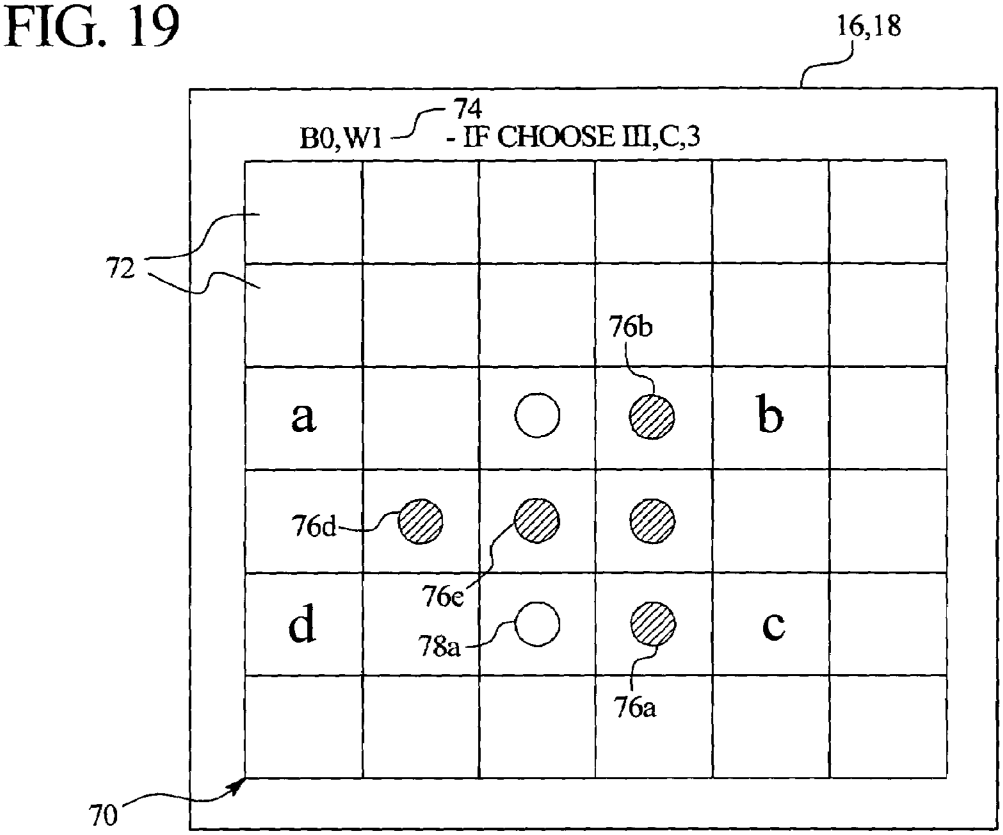
Figure 20:
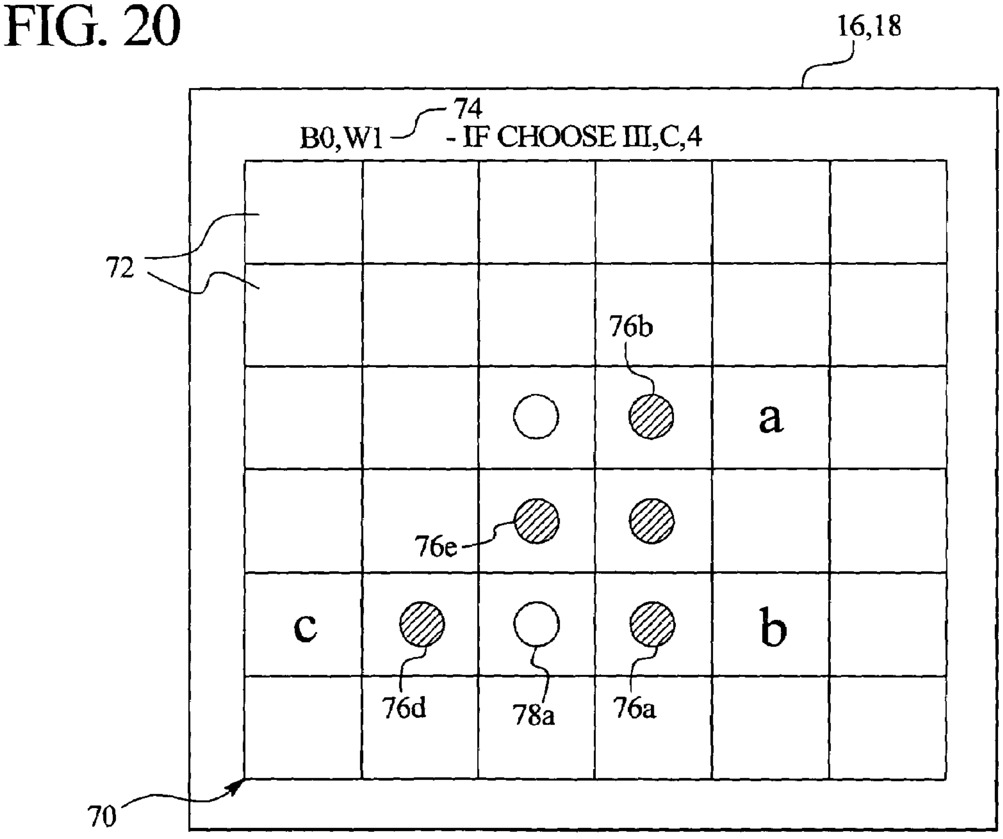

As before, the lowercase letters shown in positions 72 of grids 70 in FIGS. 17 to 21 highlight positions that the player can pick for the player's final chip placement. The lowercase letters therefore map out each of the possible outcomes from the player's choice C from grid 70 of FIG. 4, which results in the grid 70 of FIG. 7. As illustrated, FIGS. 17 and 21 both provide six possible player chip placements marked by lowercase letters a to f if the game picks position 1 and 5, respectively, in FIG. 7. FIG. 19 provides four possible positions 72 on which the player can place the final chip, marked by lowercase letters a to d, if the game picks position 3 in FIG. 7. FIG. 20 illustrates only three possible player chip placements marked by lowercase letters a to c when the game picks position 4 in FIG. 7. FIG. 18 illustrates seven possible player placements marked by letters a to g when the game picks position 2 in FIG. 7. FIG. 27 summarizing outcomes for FIGS. 16 to 21 shows that the player receives four chips regardless of the processor's final chip placement and the player's final chip placement, again eliminating skill as a factor in determining the player's overall remaining number of chips.

FIGS. 3 to 21 illustrate, map out and trace each of a series of the game possibilities that extend from the game's initial pick of position III in FIG. 3. Again, because FIG. 3 is completely symmetrical, the total number of outcomes shown in FIGS. 3 to 21 multiplied by four yields the total number of possible game outcomes from the original arrangement of player and game chips in FIG. 3.

Figure 21:
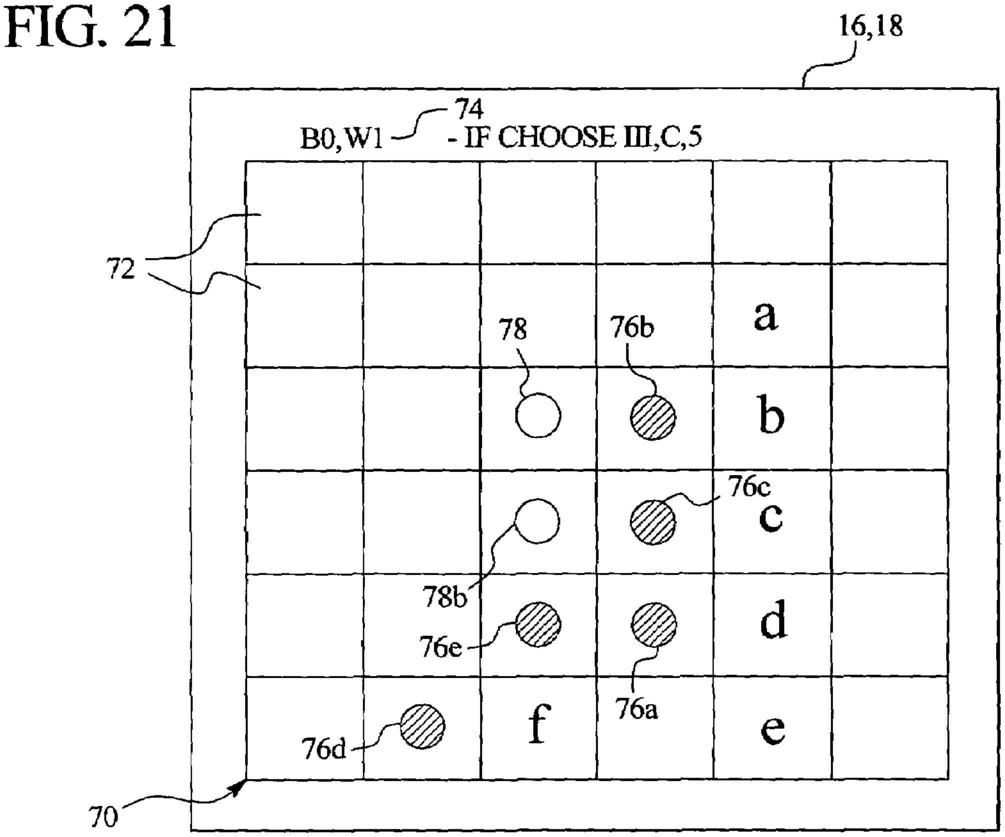
Figure 22:
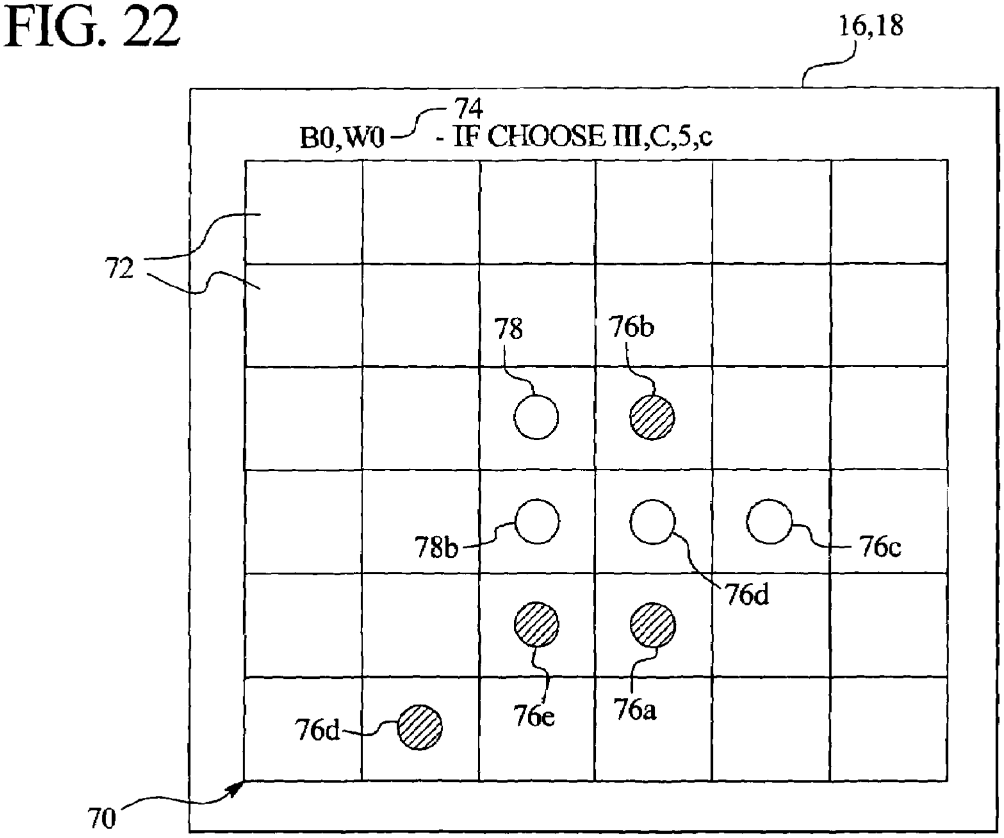
FIG. 22 is a final screen of the game piece switching game shown in FIG. 21.

Referring now to FIG. 22, grid 70 shows the outcome of the player's final chip placement via one of the screens previously described, namely, the grid 70 of FIG. 21. In that screen, the player for example chooses the position 72 marked by position c. In one preferred embodiment, the gaming device 10 highlights or otherwise directs the player to pick one of the possible positions 72 in FIG. 21. Alternatively, gaming device 10 relies on the player's knowledge of the Othello® game to pick a suitable position. If the player picks a position that is incorrect, gaming device 10 provides, an audio, visual or audio-visual alarm.

It should be appreciated that in one embodiment, the gaming device 10 is not truly a skill game. To that end, gaming device 10 can help the player in any way to keep the pace of game play brisk, and so that the player is not overly burdened with decision making. Thus, besides highlighting the possible positions for the player to pick, gaming device 10 can provide one or more hints or clues as to a selection that is potentially more lucrative than another selection. In that latter case, the game would be a bonus game, wherein the player is supposed to win at least some award, as opposed to a base game, wherein the player is playing against gaming device 10.

Grid 70 of FIG. 22 illustrates that the player's placement of player chip **76*c* on the position c in FIG. 21 caused, in combination with the player chip 78*b*, the game chip 76*c* in FIG. 21 to convert to player chip 76*d* in FIG. 22. With each of the game picks and player picks exhausted as seen from information 74 in FIG. 22, the ultimate result is that the player and gaming device 10** each accumulate four chips.

Figure 23:
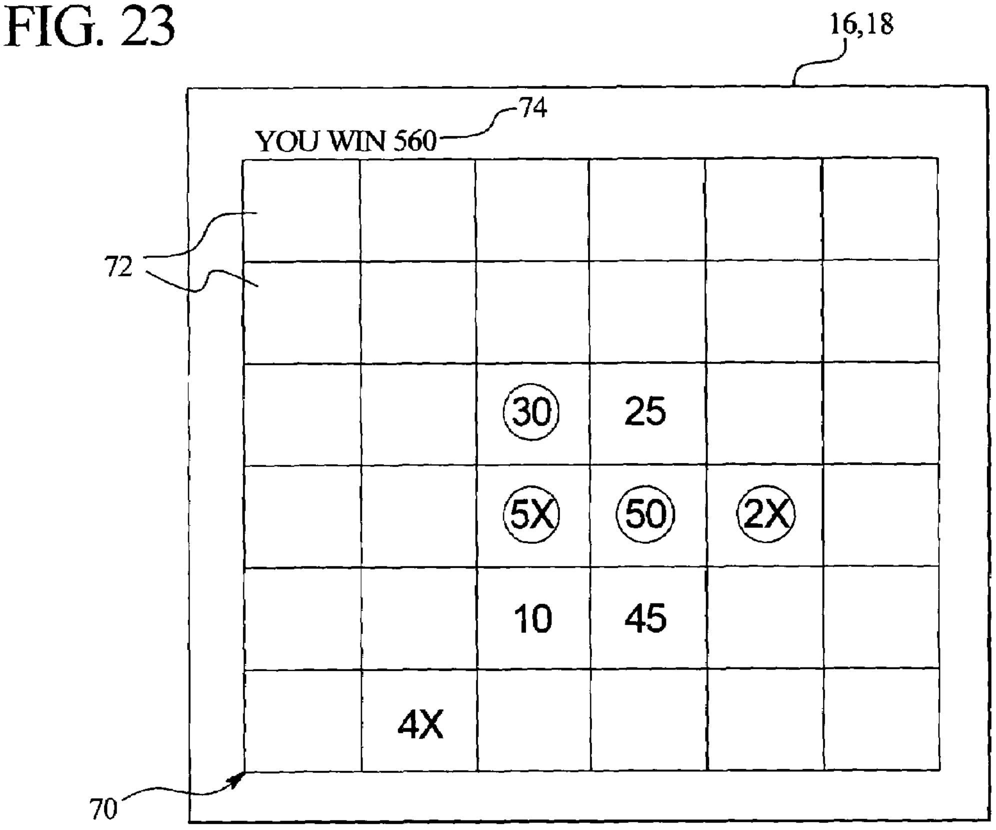
FIG. 23 illustrates, in combination with FIG. 22, one embodiment for determining an award for the player playing the game piece switching game of the present invention.

FIG. 23 illustrates one possible method, after completing the game sequence, for forming an award for the player. In one embodiment, gaming device 10 maps award values or point values to the different positions 72 of grid 70. In the illustrated embodiments, gaming device 10 does not display to the player the mapping of the values or points to the positions initially but displays them at the end of the sequence, so the player can see what each of the player chips contributed to the overall award. As illustrated, the values or points can be in the form of a number of game credits or a multiplier. In further alternative embodiments (not illustrated), the values or points represent a number of picks from a prize pool, a number of free games, a number of free spins, a non-monetary type award and any combination thereof.

In the embodiments illustrated herein, gaming device 10 forms an overall award from multiple components including values and multipliers in the following manner. Gaming device 10 sums all credit values and separately sums all multiplier values. Gaming device 10 then multiplies the summed multiplier value by the sum credit value, resulting in an overall award for the player. It should be appreciated, however, that gaming device 10 can employ a multitude of different types of methods when credits and multipliers are involved, such as summing the credit values together, multiplying that sum by a first one of the multipliers and then multiplying that product by a second one of the multipliers.

In FIG. 23, the values associated with the game's chips 76 are also revealed. This gives the player an indication of how well the player faired versus the game. As indicated by information 74 in FIG. 23, the player has won an overall amount of 560. That number can also represent a multitude of different types of values to the player, such as a credit value, a number of free spins, a number of free games, a number of picks from a prize pool and any combination thereof.

Figure 24:
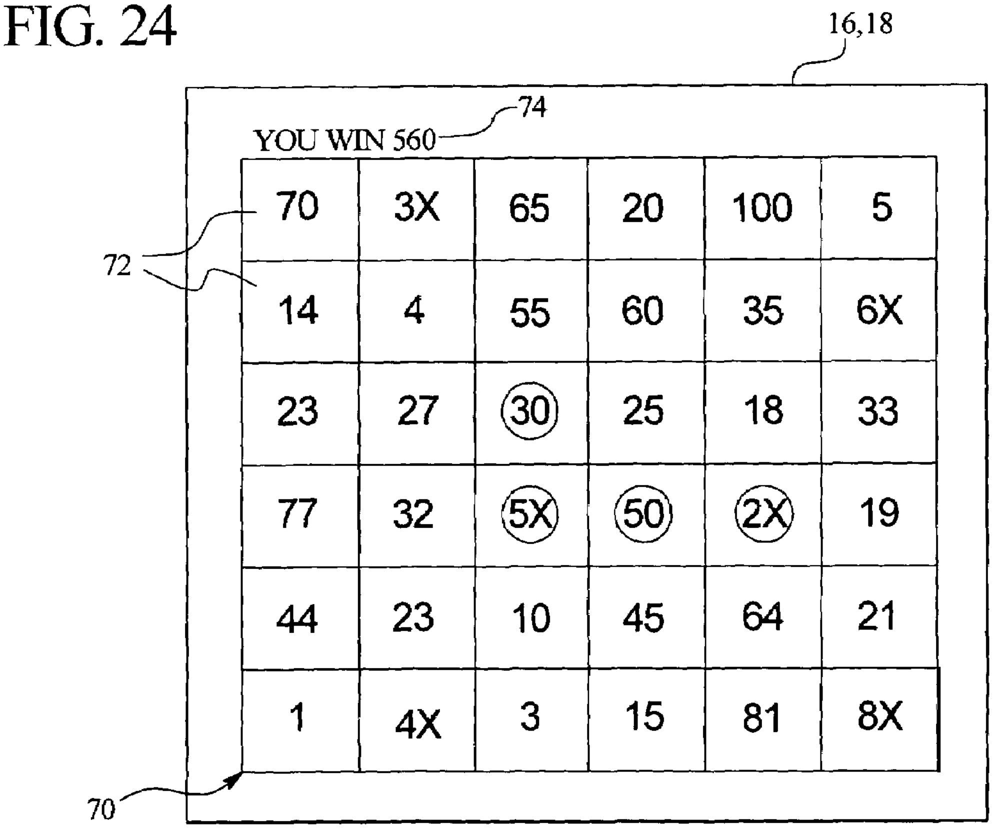
FIG. 24 is an elevation view of the display shown in FIG. 23, wherein values associated with positions not accompanied by a game piece are revealed.

FIG. 24 illustrates an alternative reveal, or FIG. 24 could be a second reveal, after the reveal of FIG. 23. FIG. 24 illustrates the values or points associated with each of the positions 72 of grid 70. The reveal of FIG. 24 shows the player the potential awards the player could have had if the player made different picks or if the game picked different positions.

Referring now to FIGS. 25 to 27, tables 80, 90 and 95, respectively stored in memory device 14, illustrate a tabulation and manipulation of the outcomes from FIGS. 3 to 21. The tables result ultimately in a weight percentage for the game's final chip placement. The weight percentage is structured so that an overall average number of player chips remaining at the end of game play is relatively constant with respect to the game's second or last pick. As stated above, the symmetrical nature of the initial orientation of chips in FIG. 3 dictates that the outcome of the game's first placement of a chip does not bias the player's odds of obtaining ultimate chips regardless of which position the game chooses. Also, gaming device 10 cannot control which position A to C that the player picks in FIG. 4 for the player's first chip placement. Based on that first player selection, however, gaming device 10 can and does manipulate the percentage that the processor will randomly generate any one of the possible positions for the game's second pick based on the position chosen by the player for the player's first pick.

Table 80 of FIG. 25 shows all the outcomes from the player's first placement of a chip on, the A position 72 in FIG. 4. Table 90 of FIG. 26 shows all the possible outcomes of the player's chip placement on the B position 72 in FIG. 4. Table 95 of FIG. 27 shows all the possible outcomes of the player's chip placement on the C position 72 in FIG. 4.

In each of the tables 80, 90 and 95, the furthest left column lists each possible outcome of the player's respective picks of the A, B or C positions 72 from FIG. 4. In FIG. 25, for example, the top four entries correspond to each of the possible outcomes of the player's final pick of one of the positions a to d in FIG. 8. The next five entries set forth each of the possible outcomes from the player's final pick of one of the positions a to e in FIG. 9. The next four entries in FIG. 25 set forth the four possible outcomes of the player's final pick of one of the final positions a to d in FIG. 10. The next three entries illustrate the three possible outcomes of the player's second pick of one of the positions a to c in FIG. 11. The final five entries represent the possible outcomes of the player's second pick of one of the positions a to e in FIG. 12.

The second column in each of the tables 80, 90 and 95 sets forth the number of player chips yielded from the final player pick. For example, if viewing FIG. 8 it should be appreciated that the player ultimately achieves four remaining player chips 78 if the player selects position a. The player achieves five remaining player chips 78 if the player chooses position b. The player achieves four chips ultimately if the player chooses either positions c or d.

It should be appreciated from the second column of tables 80, 90 and 95 of FIGS. 25 to 27, respectively, that the vast majority of the game outcomes generated from the game pick of position III in FIG. 3 yield four ultimate player chips. Therefore, since each of the outcomes from the initial game pick (e.g. III) is the same for each other initial pick (e.g., I, II or IV), it should be appreciated that the vast majority of the outcomes for the entire game is four player chips. As described below, the number of ultimate player chips effects the player's ultimate award, however, limiting each side to two picks even without weighing reduces significantly the variability in the overall remaining number of player chips. Providing three or more game/player chip placements, it should be appreciated, will increase the divergence in total player chips remaining.

The third column of tables 80, 90, and 95 of FIGS. 25 to 27, respectively, displays the average expected outcome of the outcomes stemming from the final game pick with respect to that stage in the game. For example, the average expected outcome of the final game pick illustrated in FIG. 8, which encompasses the stage of the game that includes the top four entries in FIG. 25, is 4.25. The average expected outcome from the stage of the game at FIG. 9 is 4.20 player chips 78. The average expected outcome from the stage of the game at FIG. 10 is four player chips. It should be appreciated that in table 95 of FIG. 27, each of the outcomes and thus the average expected outcome for each stage of the game at FIGS. 17 to 21 is four player chips. FIG. 26 also illustrates that the average outcomes from the two possible positions in FIG. 15 is five remaining player chips 78. It should be appreciated that the third column shows the chips which result from optimal play.

The fourth column in tables 80, 90 and 95 sets forth the overall average number of remaining player chips for the entire table, i.e., the outcome stemming from the stage of the game at the initial player pick of one of the positions A to C in FIG. 4. As illustrated, the player will fare a little better by selecting B in FIG. 4 as set forth in FIG. 26. Second, the player will fare slightly less well off by picking the A position in FIG. 4 as set forth in FIG. 25, but will perform a little better than if the player picks the C position in FIG. 4, which according to FIG. 27, insures that the player receives four remaining player chips.

The fifth column in tables 80, 90 and 95 of FIGS. 25 to 27 sets forth a factor n, which is equal to the overall average for the table divided by the average for the particular figure. Thus, in FIG. 25, for FIG. 8, factor n is equal to 4.088 divided by 4.25, which yields a factor of 0.961. The factor n in essence determines whether any particular set of position placements at the same stage of, e.g., FIGS. 8 to 12, obtains a little less or a little more or than exactly an even share of a weight applied to each of those position placements of those figures. The factor evens out the overall expected number of remaining picks for any of the position placements.

Again, gaming device 10 cannot help which position the player initially selects. However, for any selected initial player placement, gaming device 10 can even out the results. In that manner, the player's position selections in one embodiment of the game of the present invention do not effect the player's outcome as a matter of skill. In such embodiment, the game is a game of luck. The sixth column sets forth the ultimate weight provided to any particular final game pick. Viewing table 80 of FIG. 25, for example, there is a 19.2 percent chance that for the player pick A, the game will randomly generate a position 72 corresponding to pick I in FIG. 5. There is a 19.5 percent chance that the game will generate the position 2 illustrated in FIG. 5. There is a 20.4 percent chance that gaming device 10 will randomly generate any of the 3, 4 or 5 positions from FIG. 5. In FIG. 26, the percentages range from 21.2% to 26.6% for the game picks of positions from FIG. 6. In FIG. 27, the percentages are all equal at 20% for the game picks of positions from FIG. 7.

The previous paragraph teaches the normalization of the outcomes after the player's initial chip placement on position of A, B or C. As stated above, the player does best by placing the initial chip on position B (4.25), then position A (4.088) and finally on position C (4.00). Tables 80, 90 and 95 in one alternative embodiment can be normalized again with respect to one another. For example, a higher chip total table can be weighted to generate lower ones of its outcomes disproportionately more often, while a lower chip total table can be weighted to generate higher ones of its outcomes disproportionately more often. This is not possible for table 95 because each outcome is four total weighted chips. However, other lower playing tables likely will have some variance. The higher chip total table 80 to generate lower chip totals in any event will help to equalize the expected value between the player's initial choice between portions A, B or C.

As discussed above in connection with FIGS. 23 and 24, the number of player positions remaining at the end of the game is one component of the player's ultimate award. The other component is the values that are generated randomly for each position ultimately occupied by a player chip. That second component adds another layer of randomness to the player's ultimate award in the embodiment. That is, it is possible that, for example, a player obtaining four remaining player chips eventually receives a more valuable award than a player obtaining five remaining player chips.

While the above described games are dependent somewhat on the player's chip placements, the games can be controlled via central determination if the centrally determined outcome is an award value. That is, regardless of the number of player chips remaining at the end of game play (which does not vary much as shown for a two move game), gaming device 10 can reveal values associated with the remaining player chips that total to the randomly and centrally predetermined outcome.

Figure 28:
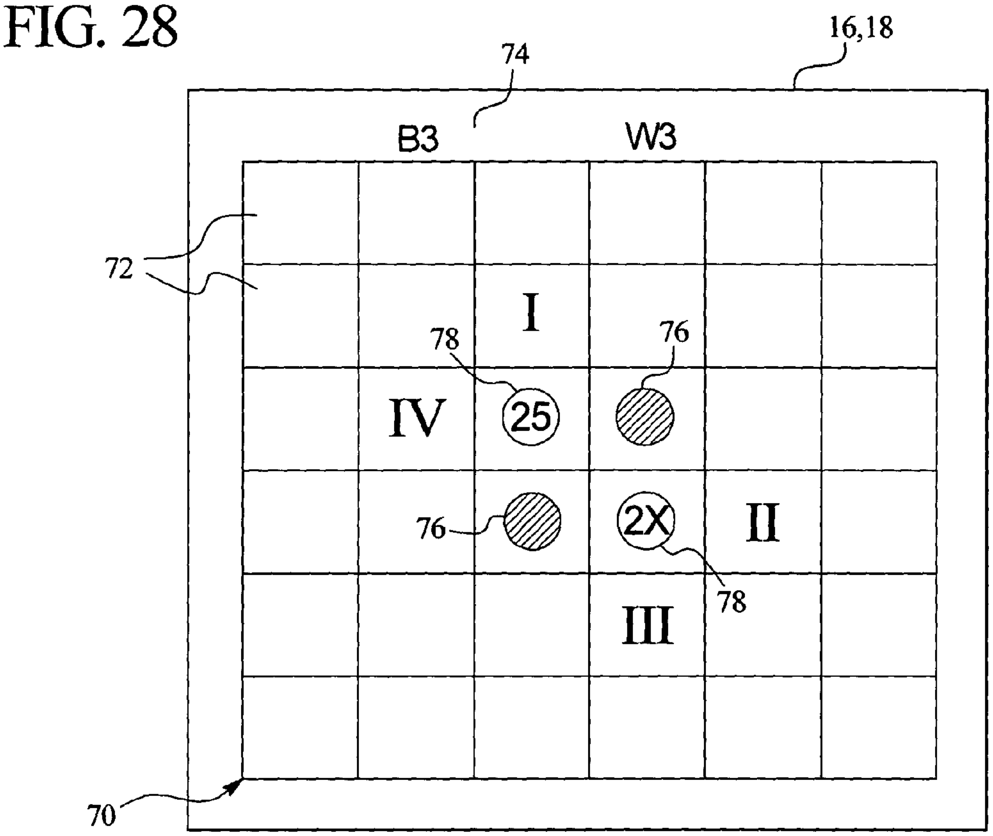
FIGS. 28, 29, 30, 31, 32, 33 and 34 are elevation views of a display device illustrating an alternative embodiment of a game piece switching game of the present invention, wherein the player's game pieces show values that are associated with positions on the game board.

Referring now to FIGS. 28 to 34, an alternative embodiment of the present invention is illustrated. In this alternative embodiment, the values associated with the positions occupied by the player chips 78 are visible to the player. In one preferred embodiment, if one of the player's chips 78 is converted to a game chip 76, the value or amount associated and displayed formerly with the player chip remains displayed in connection with the converted game chip. In that manner, the player can see certain positions 72 on board 70 that are more desirable to recapture than others. FIG. 28 sets forth essentially the same game board 70 as illustrated in FIG. 3, except that values associated with player chips 78 are shown. The originally placed game chips 76 and player chips 78 are placed on opposite diagonal lines in the center of grid 70 as is the case with FIG. 3.

Message 74 in connection with FIG. 28 indicates here that both the game and player are provided with three additional chip placements beginning with the grid 70 of FIG. 28 (FIG. 3 provided only two). The player chips 78 in FIG. 28 show a value twenty-five and a multiplier of 2×. It should be appreciated, however, any of the types of values or awards discussed above in connection with FIGS. 23 and 24 may be employed in the embodiments described in connection with FIGS. 28 to 34.

Figure 29:
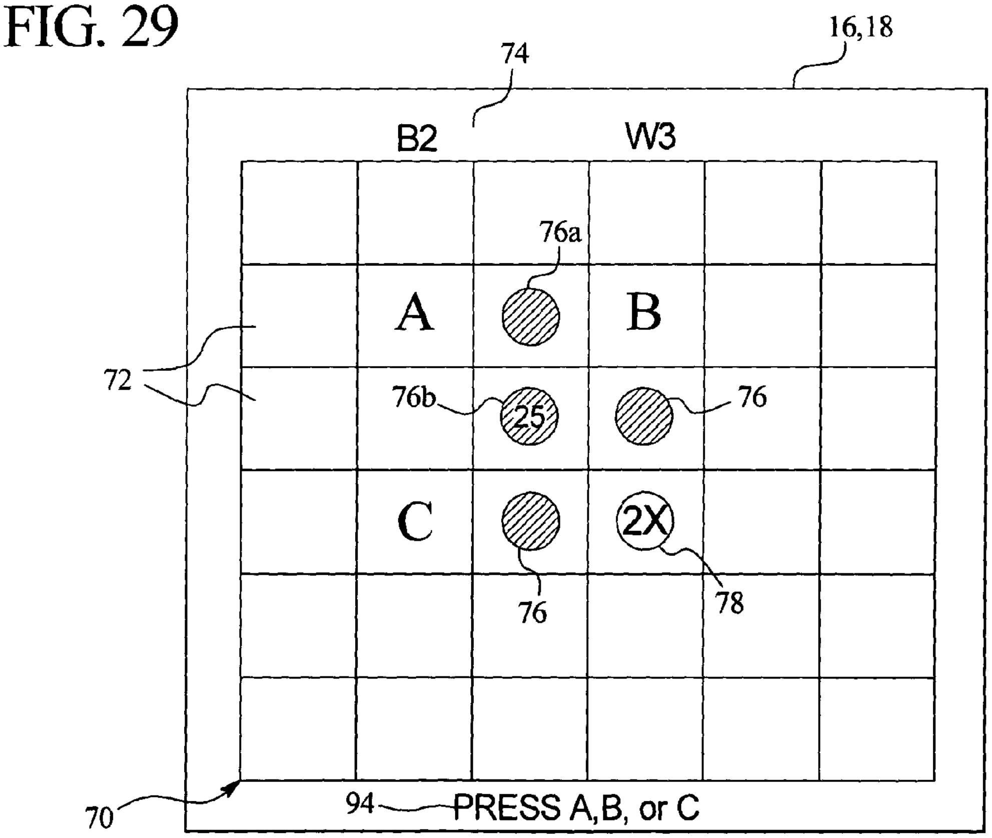

In FIG. 28, the game processor proceeds first as is the case above. The processor can choose any of the positions 72 highlighted by I to IV. As illustrated in FIG. 29, the game randomly places a game chip **76*a* on the position formerly highlighted by I. Game chip 76*a* in combination with original game chip 76 converts in FIG. 29 the former original player chip 78 to a game chip 76*b*. As illustrated, gaming device 10 maintains the display of the credit value twenty-five in connection with the newly transformed game chip 76*b***.

Message 74 of FIG. 29 also illustrates that the game's remaining picks have been reduced to two, while the player maintains three picks. FIG. 29 further illustrates or highlights for the player three positions A, B and C, that the player can choose for the player's first pick. FIG. 29 also illustrates that gaming device 10 provides a message 94 informing the player to press A, B or C.

Figure 30:
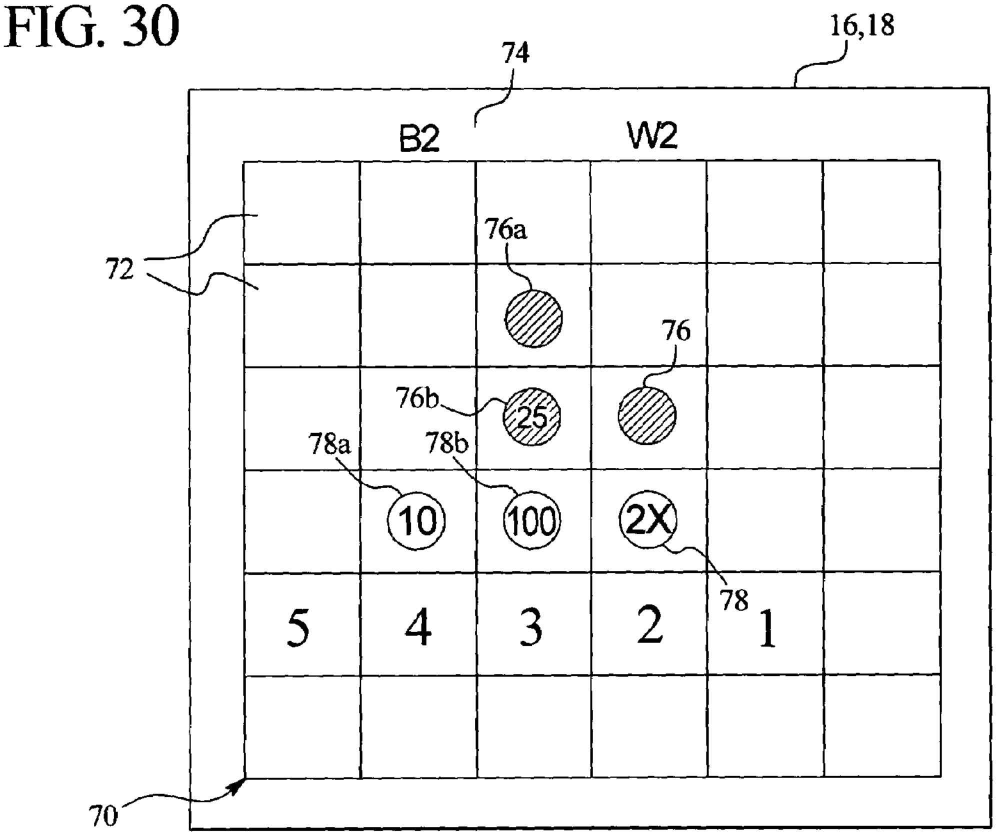

FIG. 30 illustrates that the player has picked the position formerly highlighted by the letter C on which to place a player chip **78*a*. The player has decided against attempting to recapture the twenty-five value and instead wishes to explore grid 70 for different values. Player chip 78*a* in combination with original chip 78 converts original game chip 76 to a player chip 78*b* in FIG. 30. Gaming device 10 reveals that player chip 78*a* has a value of ten, while player chip 78*b* has a value of one hundred. Message 74 in FIG. 30 indicates that both the game and player have two remaining chip placements. Also, FIG. 30 highlights five positions 1 to 5, which the game can next select to counter the player's first pick. It should be appreciated that in FIG. 30, the twenty-five value associated with game chip 76*b*** is still illustrated.

Figure 31:
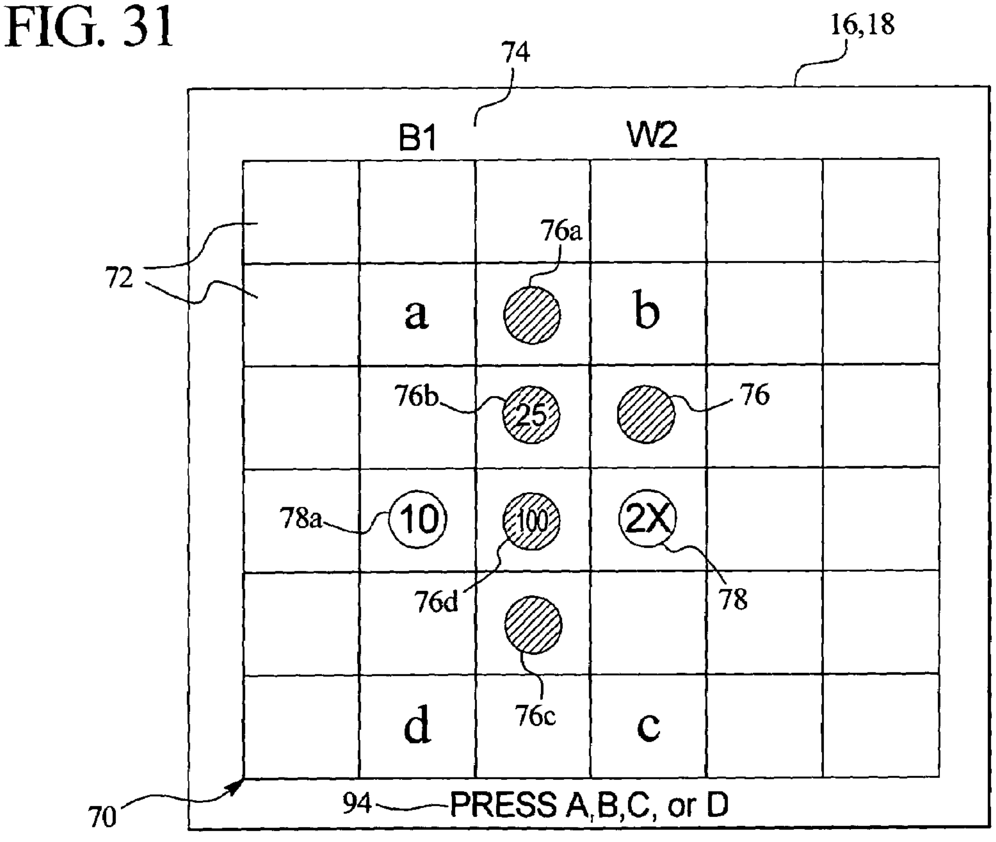

In FIG. 31, gaming device 10 places randomly a game chip **76*c* on the position 72 formerly highlighted by numeral 3 in FIG. 30. In one embodiment, gaming device 10 is programmed to select the best possible move for the game based on the available displayed values. As illustrated in FIG. 31, gaming device 10 has determined that the credit value 100 (seen in FIG. 30) is more valuable than either the credit value 10 or the multiplier 2×. Accordingly, placement of game chip 76*c* converts the player chip 78*b* in FIG. 30 to a game chip 76*d*. Message 74 in FIG. 31 indicates that the game has one chip placement remaining, while the player has two chip placements remaining. Message 94 informs the player to press one of the positions 72 highlighted by letters a, b, c or d. FIG. 31 also maintains the display of the twenty-five and one hundred credit values even though the positions associated with those values are currently occupied by game chips 76*b* and 76*d***, respectively.

Figure 32:
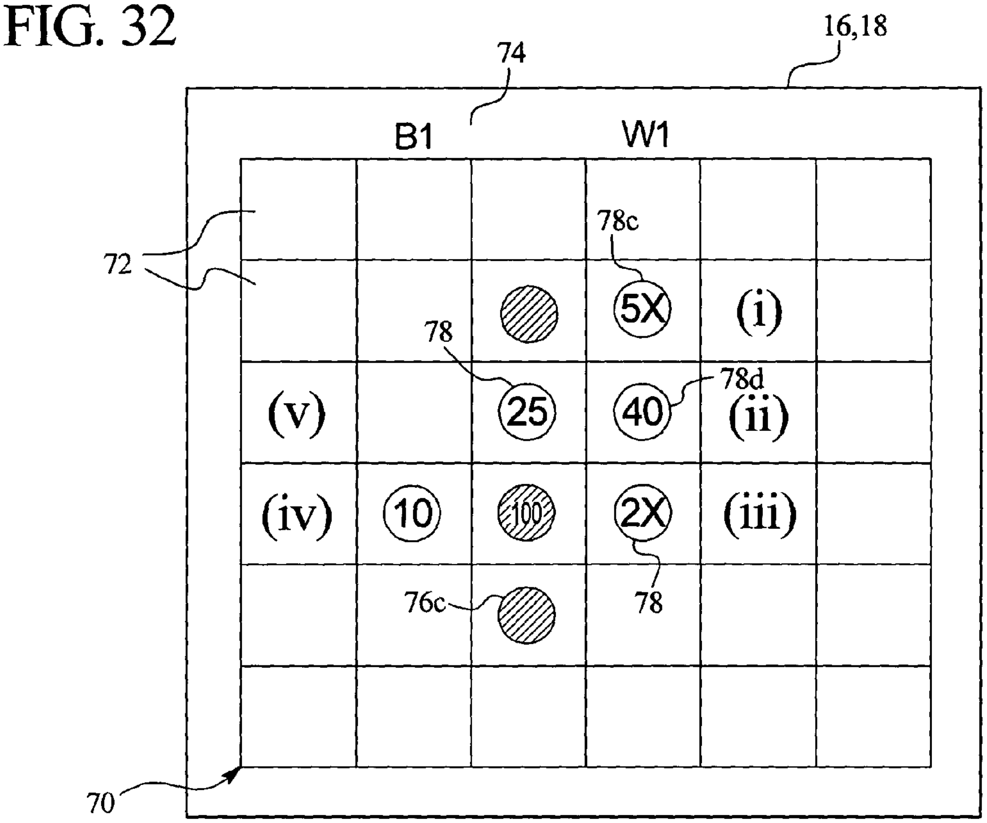

FIG. 32 illustrates that the player has chosen to place a chip **78*c* on the position 72 formerly highlighted by the letter b in FIG. 31. Player chip 78*c* in combination with original player chip 78 convert original game chip 76 to a player chip 78*d*. Player chip 78*c* uncovers the 5× value associated with its position 72. Converted player chip 78*d* uncovers the value of forty associated with its position. The placement of player chip 78*c* in FIG. 32 also reconverts former game chip 76*b* in FIG. 31 back into original player chip 78, which is associated with the value of twenty-five credits. Placement of game chip 78*c* therefore has converted two game chips for the player. FIG. 32 also illustrates numerals i to v that are available for the game's last placement. Message 74 of FIG. 32** illustrates that both the game and the player have one remaining chip placement.

Gaming device 10 is programmed in one embodiment to look for positions that will convert multiple player chips to game chips. In such a case, gaming device 10 would place in FIG. 33 a game chip 76*e* on the position formerly highlighted by number 4 (iii) in FIG. 32. That placement converts original player chip 78 associated with the value of 2× and player chip 78*d* to game chips 76*f* and 76*g*, respectively. The values 2× and forty are still illustrated in connection with the positions now occupied by game chips 76*f* and 76*g*. Message 74 in FIG. 33 informs the player that the game is out of the picks and that the player has one remaining placement. Message 94 prompts the player to place a chip on one of the positions 72 highlighted by double letters aa to hh.

Figure 33:
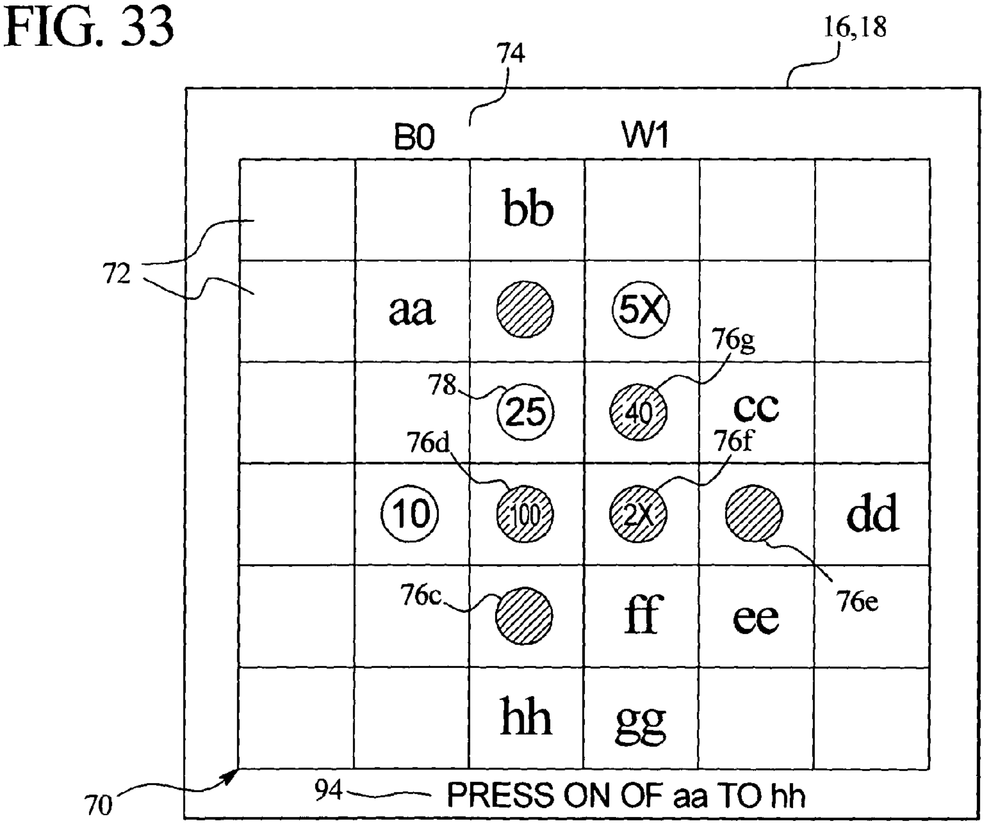

FIG. 33 presents the player with the opportunity to convert multiple game chips with the player's final placement. For example, the player can convert two game chips 76*c* and 76*g* to player chips by putting a player chip on position ff. The player can convert two game chips 76*c* and 76*d* to player chips by putting a chip on position hh in FIG. 33. In FIG. 33, the player decides between the visible value forty (76*g*) and the visible multiplier 2× (76*f*) versus the visible value one hundred (76*d*) and an unknown value (76*c*). The player can convert three game chips 76*c* to 76*f* by placing a player chip on position dd in FIG. 33.

Figure 34:
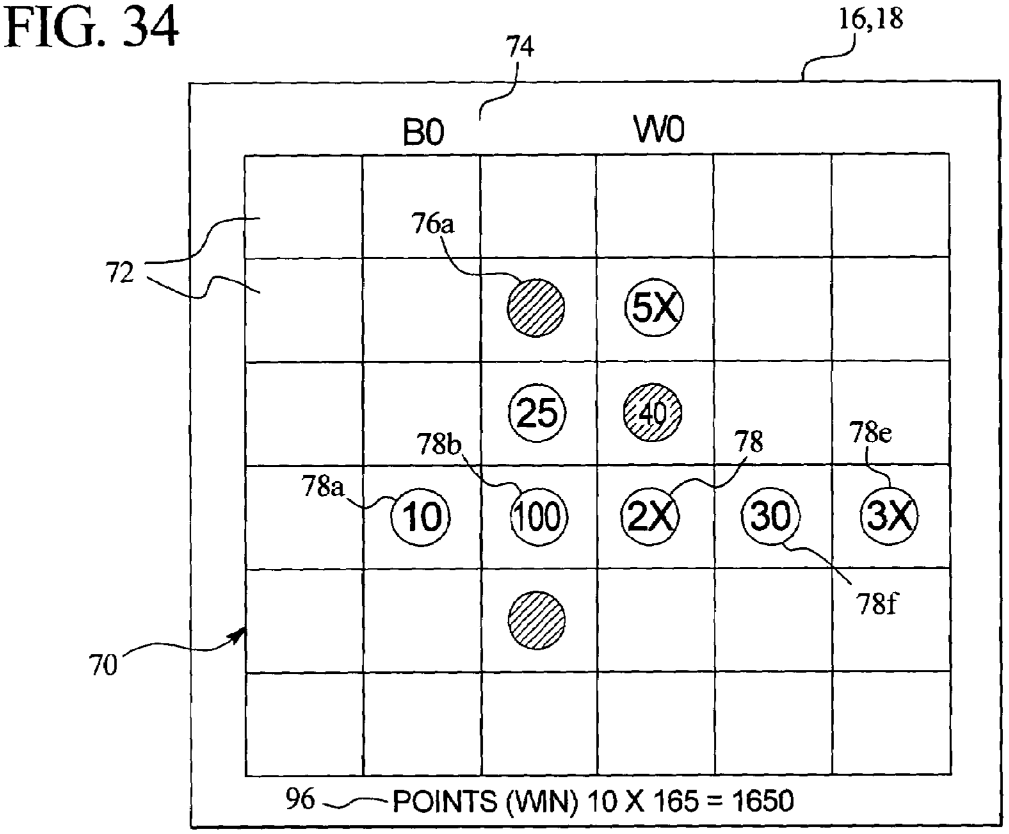

As illustrated in FIG. 34, the player opts for the latter option and places the last chip on position dd illustrated in FIG. 33. That is, in FIG. 34, the player places player chip 78*e* on position dd, which in combination with player chip 78*a* converts game chips 76*d*, 76*f* and 76*e*. Game chip 76*d* is converted to formerly held player chip 78*b*. Game chip 76*f* is converted to former original player chip 78. Game chip 76*e* is converted to new player chip 78*f*.

Message 74 indicates that both the game and the player chip placements are exhausted. Message 96 indicates that the points or award for the player is the sum of all the multipliers times the sum of all the values or 10× multiplied by 165, 1650 yielding points or credits. As described in more detail below, the game of FIGS. 28 to 35 lead itself to be in a hand-held or computer game, or a game between two players, in any of which points rather than credits are accumulated, i.e., a non-wagering game.

To that end, the game of FIGS. 28 to 35 can be implemented in various different types of gaming formats. In one embodiment, the game is played on a hand held or portable gaming device, wherein the game is not a wagering game, but instead a game of fun that is played for the player to accumulate as many points as possible. In that game, the player may be forced to make moves that are different from moves typically made in the Othello® game. For example, the player may opt to convert a lesser amount of game pieces to accumulate a higher value conversion. Or, the player may decide not to capture an end or a corner spot again in order to achieve a higher point value. It should thus be appreciated that the present invention is not limited to wagering games. However, the embodiment of FIGS. 28 to 34 could alternatively be a base or bonus wagering game. In FIG. 34, the player could, for example, win sixteen hundred fifty credits, which are redeemable for cash or prizes.

Figure 35:
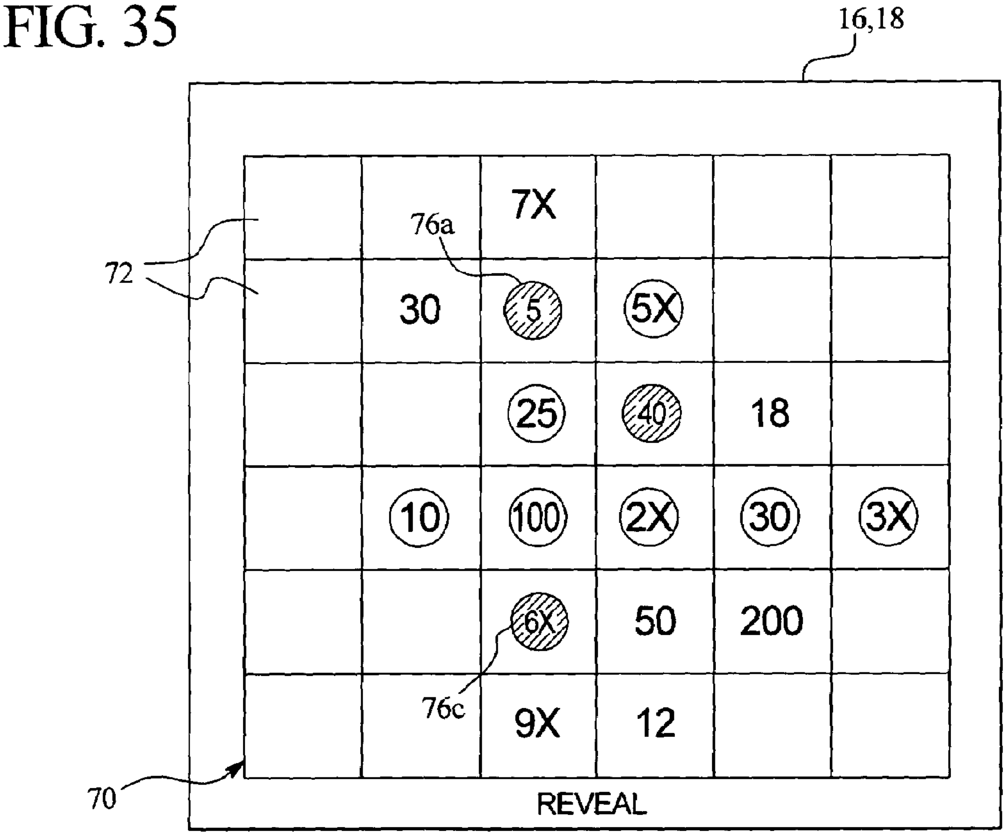
FIG. 35 is an elevation view of one of the display devices that illustrates one possible reveal screen after the final screen of FIG. 34 for the embodiment illustrated in FIGS. 28 to 34.

Referring now to FIG. 35, one example of a reveal sequence for the games of FIGS. 28 to 34 is illustrated values associated with positions that have game symbols as well as positions that the player could have chosen in FIG. 33 is illustrated. Here the gaming device 10 reveals the five value on the position associated with game chip 76*a* of FIG. 33. The reveal sequence of FIG. 35 also reveals the 6× value associated with the game piece 76*c* of FIG. 33. Gaming device 10 also reveals the values thirty, 7×, eighteen, two hundred, fifty, twelve, and 9×, which are associated with the positions aa, bb, cc, ee, ff, gg and hh, respectively, of FIG. 33. The reveal sequence shows the player values that the player could have obtained via the placement of the player's final game chip.

Referring now to FIGS. 36 through 40, a further alternative embodiment of the present invention is illustrated. This embodiment, as with the last, can be implemented in a hand held gaming device, as a computer game played at home, as a game played by one or two players, as a wagering game or secondary game triggered by a wagering game displayed on gaming device 10 or via the internet on a personal computer monitor.

The embodiment of FIGS. 36 to 40 displays values associated with each of the positions 72. In that manner, the player can view the game board 70 prior to game play to gain a feel for where the valuable positions are located, so that the player can either capture one of those positions on a first move or work towards capturing the positions over multiple moves.

Figure 36:
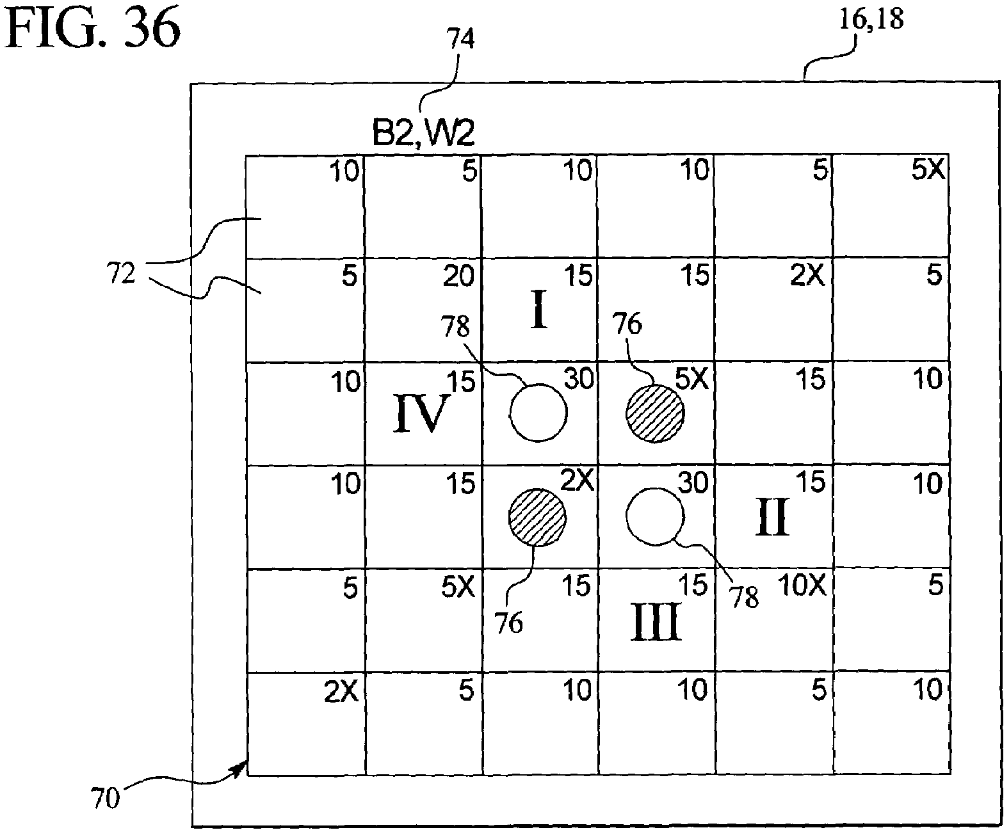
FIGS. 36, 37, 38, 39 and 40 are elevation views of a further alternative embodiment of the present invention, wherein award values associated with the positions of the game board are illustrated.

FIG. 36 illustrates in combination with displayed values, the original screen shown in FIG. 3 with the diagonal arrangement of game pieces 76 and player pieces 78. Message 74 indicates that both the game and the player have two game piece placements as of the point of the game of FIG. 36. The game can randomly place a game chip at any of the positions I to IV.

Figure 37:
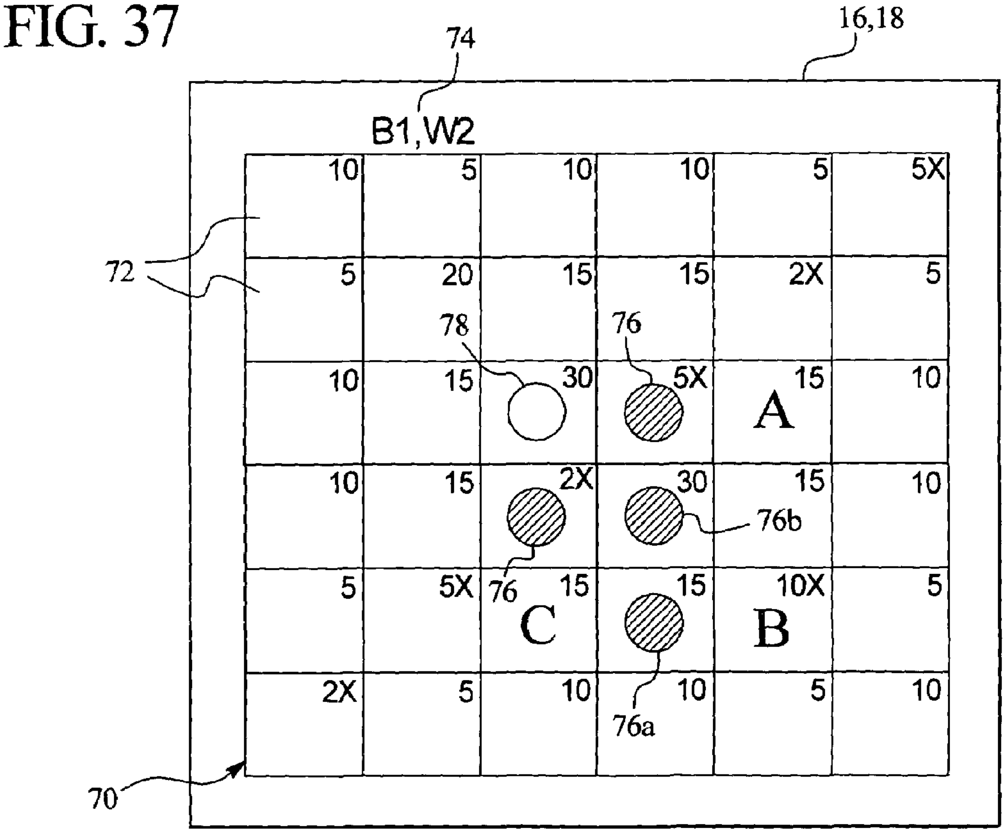

FIG. 37 illustrates that gaming device 10 used its first placement to place game piece 78*a* in position marked by III of FIG. 36. Game piece 78*a* captures the fifteen value displayed by its associated position. Game chip 76*a* also converts the original player chip 78 to game chip 76*b*, which netted the game an additional thirty value. In one embodiment, gaming device 10 makes moves to maximize the values obtained by those moves. FIG. 37 also illustrates that the player can choose to place a first player chip on positions A, B or C in FIG. 37.

Figure 38:
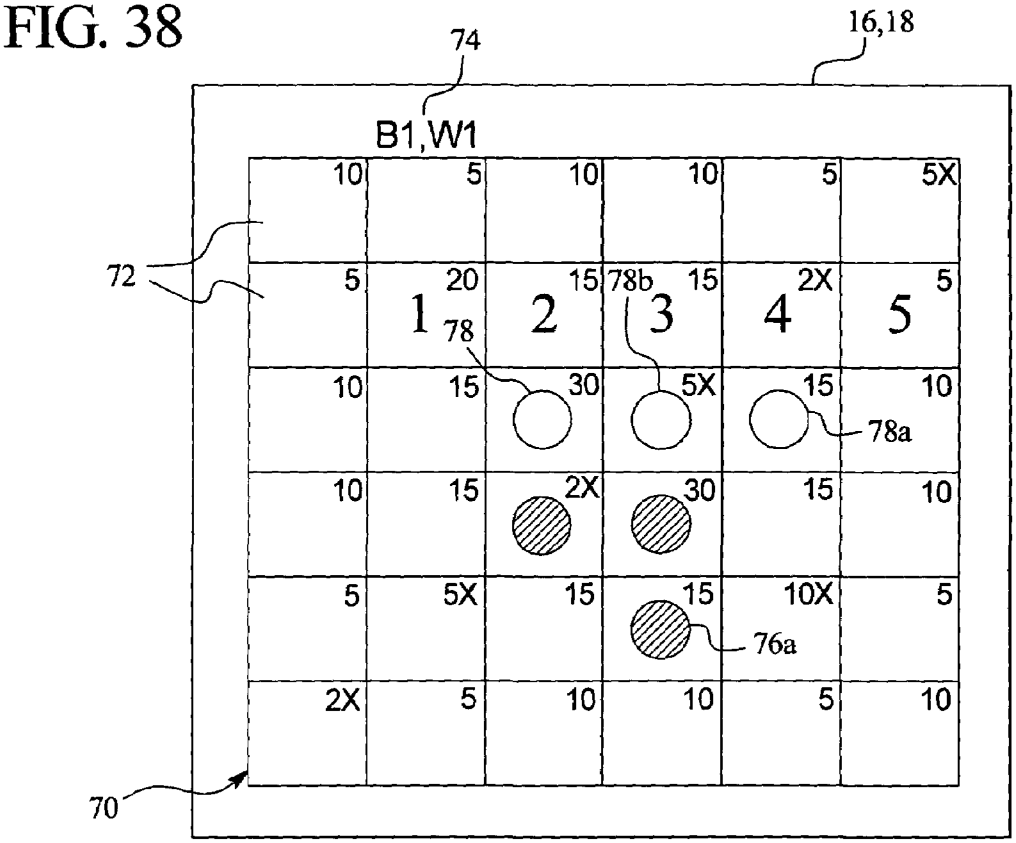

FIG. 38 illustrates that the player placed player chip 78*a* on position formerly highlighted by letter A in FIG. 37. The game chip 78*a* converts original game chip 76 to a player chip 78*b*. Player chip 78*a* resides on a position having a value of fifteen, while player chip 78*b* garners the player a 5× value. FIG. 38 also illustrates that the game can then place its last chip on any of the positions marked by numbers 1 to 5.

Figure 39:
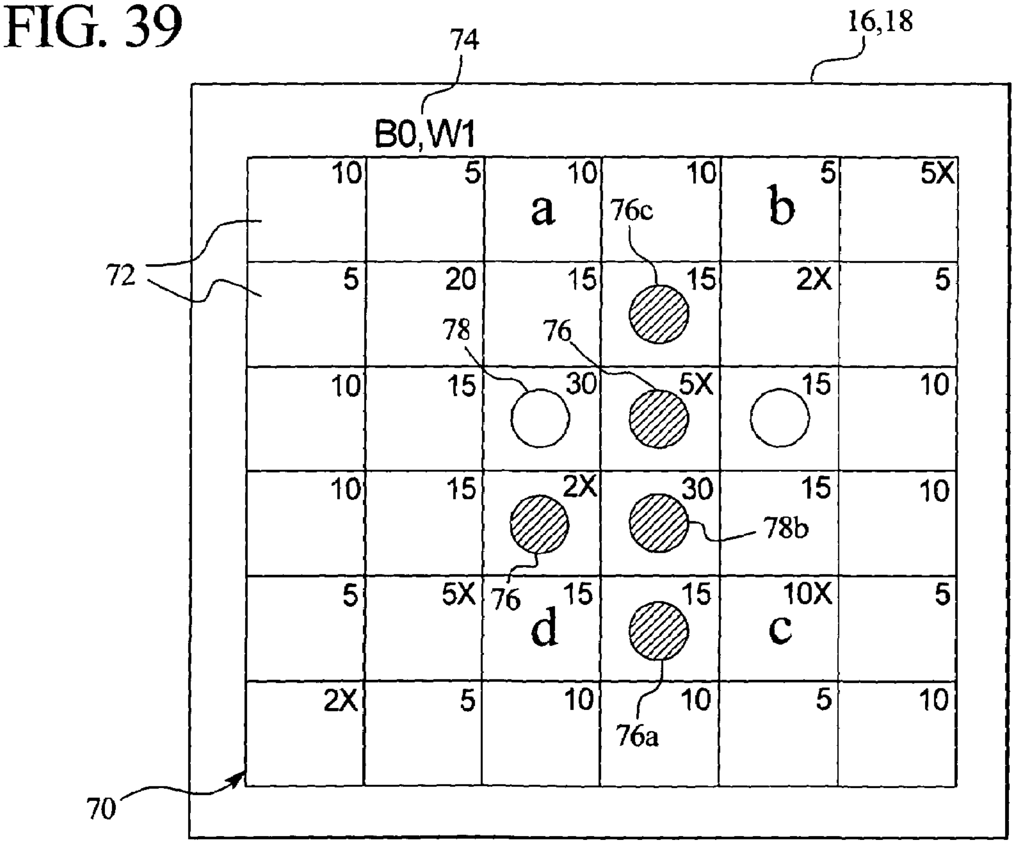

FIG. 39 illustrates that gaming device 10 has recaptured the 5× value by placing game chip 76*c* on the position formerly marked by number 3 in FIG. 38. The game recaptures the that value and nets an additional credit value of fifteen. FIG. 39 also illustrates that positions a to d are available to the player to select with the player's final pick. Although not illustrated, the game could keep a tally of the players points or credits versus the game's points or credits. Such a feature is accomplished in one embodiment via the use of optics to sense which color is placed in which weighted position (for actual game board and chips) or via the use of an electronic touch panel, such as touchscreen 42 shown in FIG. 2A (for virtual game). The touchscreen 42 sends color and weighting information back to the processor. Both the electromechanical or electronic embodiments enable each side's total to be displayed on an electronic display.

Figure 40:
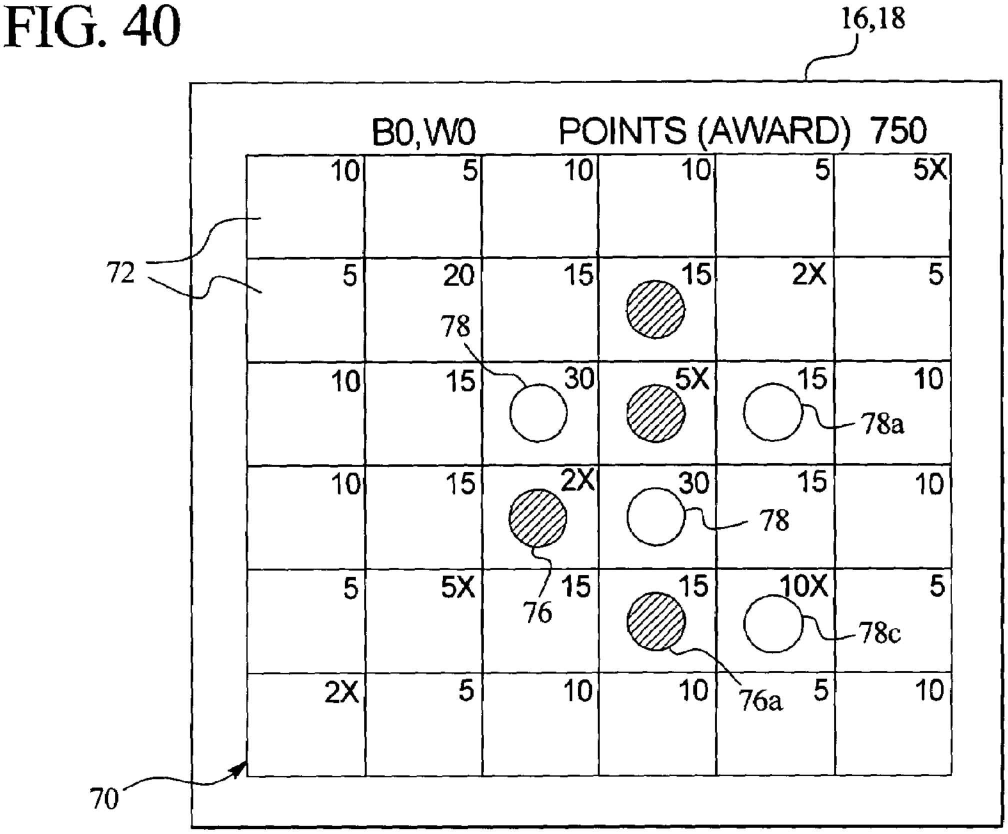

FIG. 40 illustrates that the player elects to capture the 10× value by placing player chip 78*c* in the position formerly marked by d in FIG. 39. Player chip 78*c* in combination with original player chip 78 converts the game chip 78*b* to the original player chip 78. The player thus recaptures the original value thirty and adds a 10× to the player's total. The player in FIG. 40 does not opt for the opportunity to convert two game pieces 76 and 76*a* by placing the player's final chip in the position marked by e in FIG. 39.

That is, the player chose to capture the thirty value and the 10×values rather than the fifteen (position e), 2× (76) and thirty (78*b*). The player's total award is the sum of the credit or point values or seventy-five multiplied by ten, yielding seven hundred fifty. As discussed above, the seven hundred fifty can represent points that are accumulated by a player, for example, in a hand held game. Otherwise, the seven hundred fifty can correspond to an award for the player or an award can be based upon the total of seven hundred fifty.

Referring now to FIGS. 41 to 45, another alternative embodiment of the present invention is illustrated. The embodiment of FIGS. 41 to 45 pits two players against one another. It should be appreciated that the previous embodiments of FIGS. 28 to 35 and 36 to 40 could also pit two players against one another, e.g., via a board game played by two players. In the embodiment of FIGS. 41 to 45, the values displayed to the players are associated with the game pieces or game chips rather than the positions on board 70. The display device 16 or 18 also accumulating and displays the total points or value accumulated by each player which can be done in any of the embodiments described herein. Since each player piece shows a value, square and circle pieces are used instead of black and white pieces as shown above. The square game pieces 176 can be likened to the former black game pieces 76, while circular game pieces 178 are analogous to former white game pieces 78.

Figure 41:
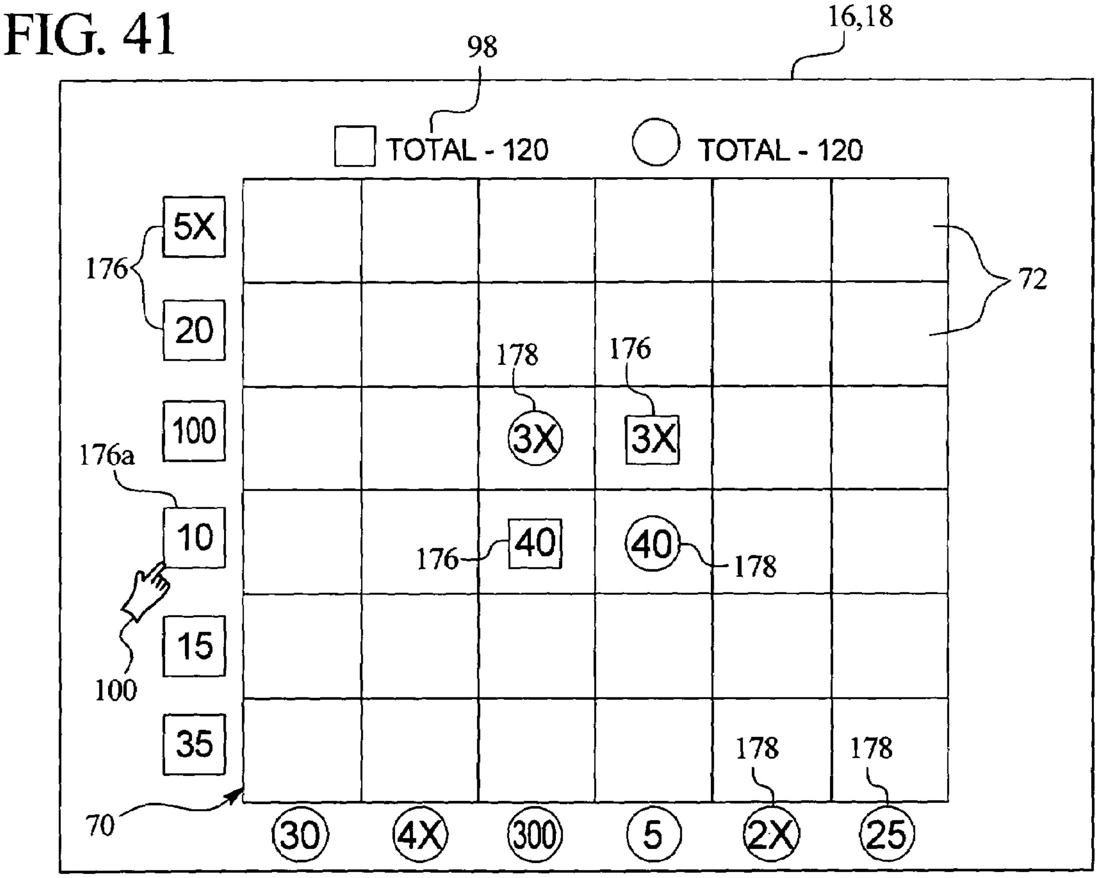
FIGS. 41, 42, 43, 44 and 45 are elevation views of one of the display devices illustrating yet another alternative embodiment of the present invention, wherein one or more players can place game pieces having values displayed thereon onto desired positions of the game board.
Figure 42:
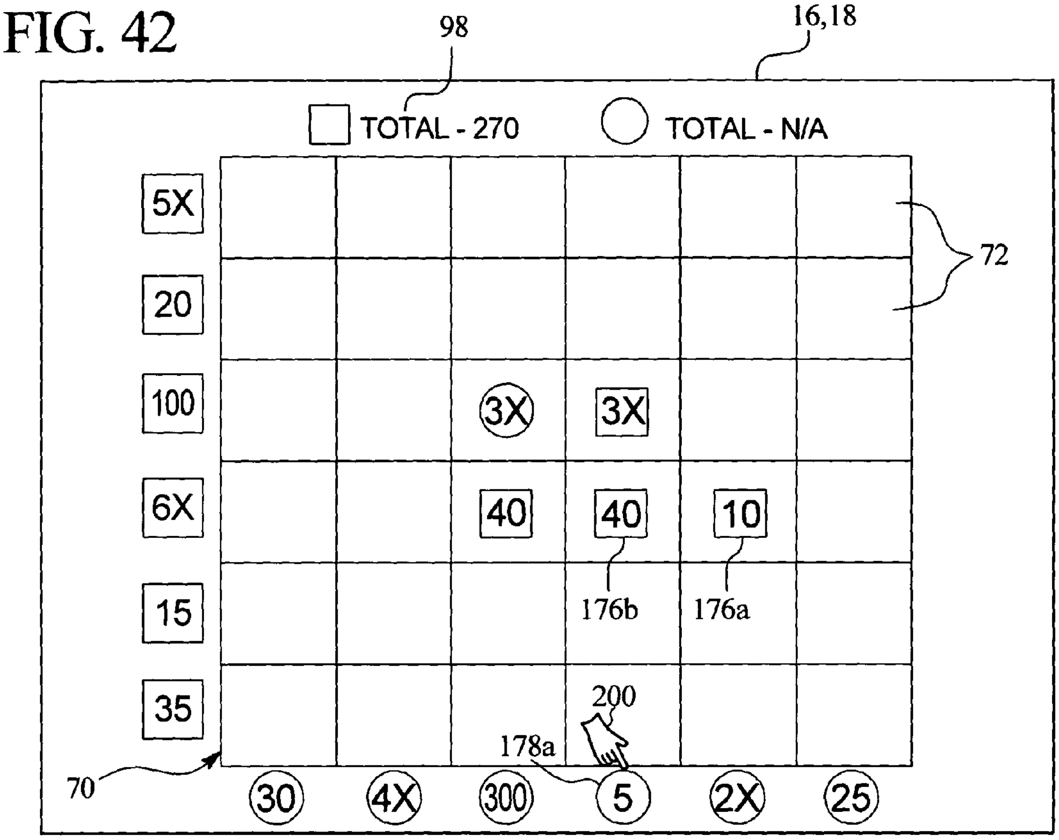

FIG. 41 illustrates the initial placement of game pieces 176 and 178. To begin, the players each start with the same initial total of one hundred twenty points or credits. Also, each player is provided with an initial stable of chips shown alongside grid 70. Player 100 is randomly provided the 5×, 20, 100, 10, 15 and 35 values, while player 200 is provided initially the 30, 4×, 300, 5, 2× and 25 values. In an alternative embodiment, players 100 and 200 are provided with chips having the same starting values. The pieces are symmetrically placed in the middle of board 70 as has been done previously. The square or black piece goes first and a first player 100 chooses in FIG. 42 to place a relatively low value chip 176*a*, having a value of ten, onto the board to thereby convert the second player's value of forty of original player chip 178 to a game piece 176*b* for player 100. As illustrated in FIG. 42, the total for the player 100 increases to two hundred seventy. The total for the second player is not available because the second player currently only has a multiplier value and nothing to multiply. As seen in FIG. 42, player 200 selects a relatively low five value of game piece 178*a* to place in a position in FIG. 43 to thereby convert player 100's forty value of chip 178*b* to a player 200 value of forty associated with chip 178*b*.

In one preferred embodiment, gaming device 10 replenishes game pieces that the player places onto grid 70. In the illustrated embodiment, gaming device 10 provides the player with six game pieces from which to select to place onto board 70. When player 100 picked the ten value in FIG. 41, gaming device 10 randomly generated a new value or a 6× value in FIG. 42 to replenish the loss of the ten value from the players stable of six chips. Likewise, when player 200 picked the five value in FIG. 42, gaming device 10 randomly generated a new value of eighteen for player 200 as seen in FIG. 43.

The strategy employed by players 100 and 200 in the game of FIGS. 41 to 45 is initially not to use their higher values because those values are located in the relative middle of board 70 and are therefore good candidates to be converted eventually into possession of the other player. Hence, the initial selection of player 100 was the ten value and the initial selection of the player 200 was the five value.

Figure 43:
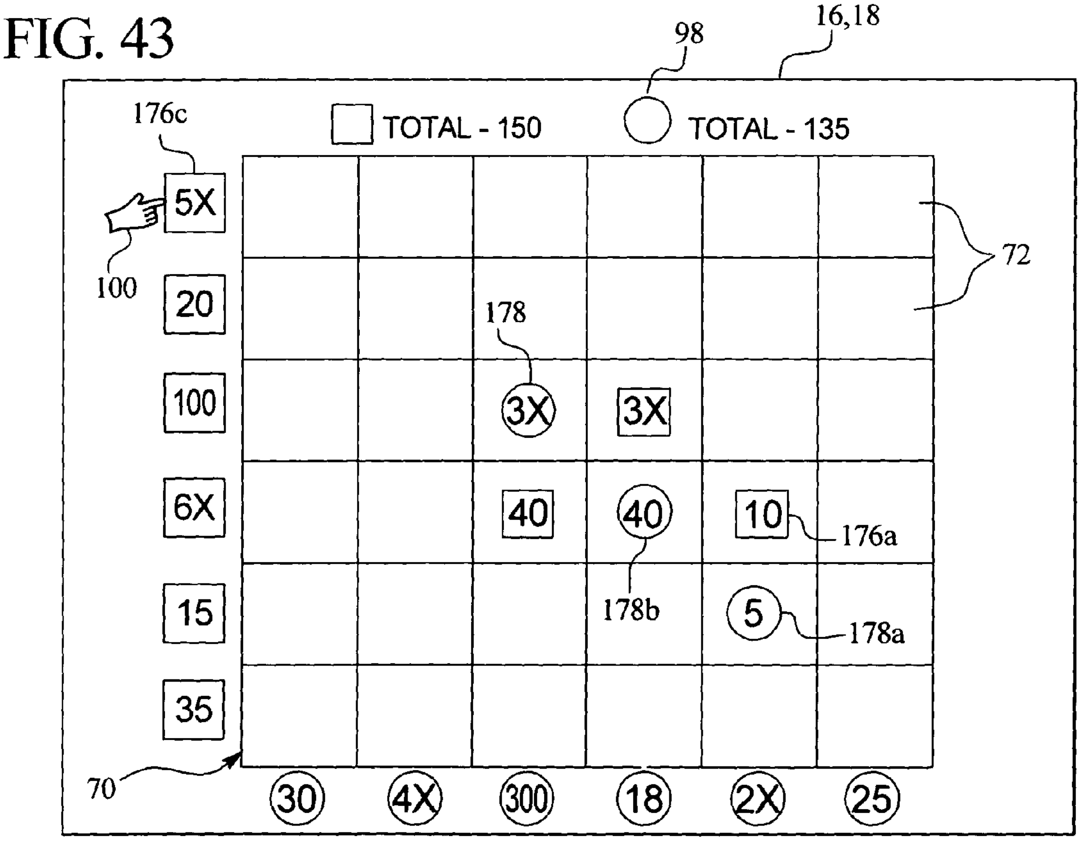

In FIG. 43 the placement of chip 178*a* operates in combination with original chip 178 to convert the square chip 176*b* in FIG. 42 to a round chip 178*b* in FIG. 43. In the illustrated embodiment, the conversion of a chip does not alter the chip's points or award value. In an alternative embodiment, a conversion from one type of chip to another increases or decreases the value of the chip. As illustrated by meter 98 in FIG. 43, the total for the player 100 with the square chips is one hundred fifty, while the total for the player 200 with the round chips is one hundred thirty-five.

Figure 44:
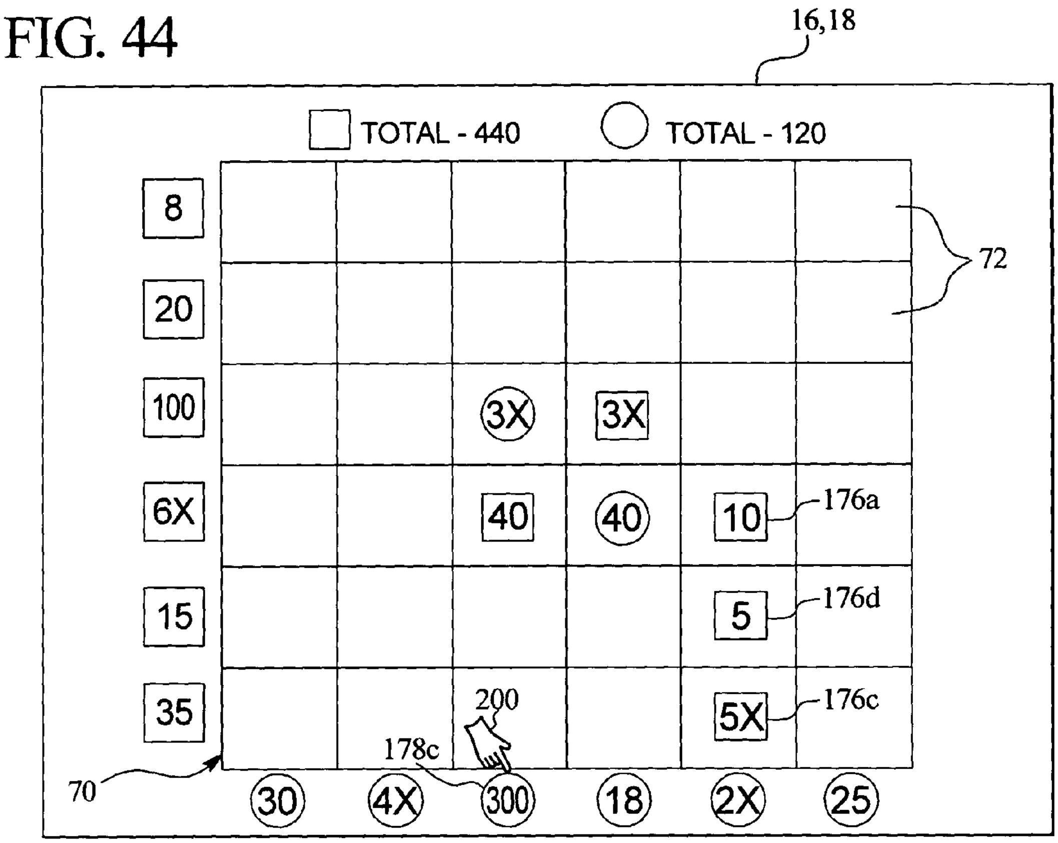

FIGS. 43 and 44 illustrate that player 100 counters the move of player 200 in FIGS. 42 and 43 by selecting the chip 176*c* and placing that chip on the grid 70 of FIG. 44. Chip 176*c* has an inherent value of 5×. Chip 176*c* in combination with round chip 176*a* converts sequence chip 178*a* to round chip 176*d*. Player 100 placed a relatively high value chip (5×) in grid 70 of FIG. 44 because the chip is located along a row. Typically, chips along a row in the Othello® game are harder to change over than are chips appearing in the middle of the board. FIG. 44 also illustrates that the placement of the 5× chip has increased the player 100 total to four hundred forty and decreased the player's 200 total to one hundred twenty.

Figure 45:
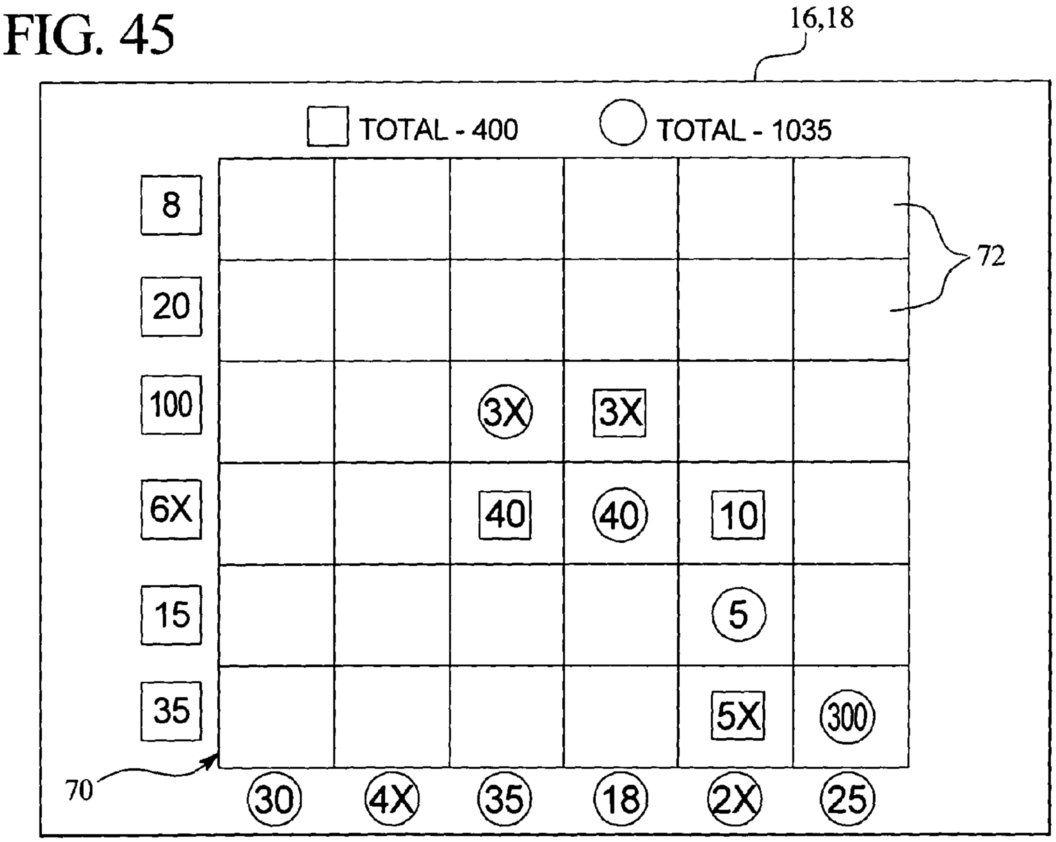

FIGS. 44 and illustrate that the player 200 counters player 100's most recent move by placing the player's largest value chip 178*c* having a value of three hundred into the corner position of grid 70 of FIG. 45. Player 200 used the player's biggest available value because the player knows that round chip placement in the corner position of FIG. 45 can never be converted back to a square chip.

As illustrated in FIG. 45, gaming device 10 replenishes the loss of the three hundred value from player 200's stable with a thirty-five value. If the chip 178*c* placement ended the game it would not have to be replenishes. The game of FIGS. 41 to 45, as well as any game described herein, can continue until all positions 72 of board 70 are filled. In the end, the player with the most points on credits wins. In one embodiment, the chips are replenished randomly. The chips can be potentially with 10 chips of the same value or the total pool of numbers or points can have only one of any particular point or award value or a limited set of same.

While the embodiments of FIGS. 41 to 45 are played by two players in one preferred embodiment, they are alternatively played on a gaming device against a computer. Still further, the game can be incorporated into a wagering game that pits either one player against the computer or one player against another player. For example, gaming device 10 could require an initial wager by two players of a dollar and payback a portion of one of the wagers to the winner and keep a percentage of the loser's wager. For example, the game could pay sixty cents of the dollar wagered by the loser to the winning player and keep forty cents.

In any of the embodiments described herein in connection with FIGS. 1 to 45, the values associated with the player's chips can include, additionally or instead, bonus triggering symbols or values. The bonus trigger symbols alone or in combination with other symbols, e.g., via a persistence meter, take the player to a bonus game played on video monitor 16, 18 or on an electromechanical display, e.g., a separate spinning wheel or reel. The bonus game provides potentially more credits to the player. When such bonus triggering symbols and games are used, the Othello® type game of the present invention can be a base or primary game or itself be a bonus game based on, for example, slot, poker, keno, blackjack, etc.

Further, as stated above, any of the values described herein can be mystery values that force the player to weigh the choice between the displayed value versus an opportunity for a potentially higher or lower value. The mystery values are eventually displayed to the player and combined with the player's award.

Referring now to FIG. 46, a weighted probability table 220 stored in memory device 14 is shown having many of the values and multipliers used throughout the foregoing disclosure. Table 220 shows values and multipliers, however, other tables can be employed having only values or only multipliers. Table 220 includes fifty weighted entries, however, other tables may be used having more or less than fifty entries and may or may not be weighted.

Table 220 is applicable to any of the embodiments described herein. For example, table 220 can be used during the sequence of FIGS. 3 to 24 to provide values (values or multipliers) for the player's remaining game chips (or be distributed to match a randomly predetermined, e.g., centrally determined award). In FIGS. 22 to 34, table 220 is used for example to assign randomly values/multipliers to the positions receiving the player's chip placements. In FIGS. 36 to 40, table 200 can be used to supply the values/multipliers displayed to the player on grid 70. Alternatively, as shown in FIGS. 36 to 40, the values are arranged in one embodiment according to a predetermined pattern. Again, in FIGS. 41 to 45, table 220 is used in a embodiment to assign values/multipliers to the two players' chips prior to or at the time the chips are placed in the different players' chip stables.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A method of operating a gaming device, said method comprising:

(a) randomly generating a designated target number of player chips, wherein the designated target number of player chips is greater than zero;

(b) causing at least one display device to display a playing board having a plurality of positions;

(c) enabling a player to individually place one of a plurality of player chips at one of the positions, wherein placement of said player chip that causes at least one of a plurality of game chips to be flanked on opposite sides by player chips converts each said flanked game chip to a player chip;

(d) causing the at least one display device to display the placed player chip at said position;

(e) using a table in memory that is weighted according to said designated target number of player chips remaining to individually place one of the plurality of game chips at one of the positions, wherein placement of one of the game chips that causes at least one player chip to be flanked on opposite sides by game chips converts each said flanked player chip to a game chip;

(f) causing the at least one display device to display the placed game chip at said position;

(g) repeating steps (c) and (f) until the player has placed a provided amount of player chips onto the positions of the playing board; and (h) thereafter, providing an award to the player based on the remaining number of player chips after the player placed the provided amount of player chips onto the positions.

2. The method of claim 1, which includes placing an initial configuration of game and player chips on the board, leaving a plurality of possible positions to place additional chips to thereby convert one of the initially placed chips.

3. The method of claim 2, which includes generating one of the possible positions to be filled by one of the game chips to thereby convert one of the player chips to a game chip.

4. The method of claim 2, which includes enabling the player to select one of the possible positions to be filled by one of the player chips to thereby convert one of the game chips to a player chip.

5. The method of claim 1, which includes providing an award to the player based on a combination of values associated with positions having the remaining player chips.

6. The method of claim 5, which includes associating the values randomly with the positions.

7. The method of claim 5, which includes associating the values individually with each of the positions prior to game play.

8. The method of claim 5, which includes associating the values with each of the positions and causing the at least one display device to display the values to the player during game play.

9. The method of claim 5, which includes causing the at least one display device to displaying the values of the positions having the remaining chips when the player chips are first displayed in the positions.

10. The method of claim 5, which includes selecting the values from the group consisting of: game credits, game credit multipliers, a number of free spins, a number of free games, a number of picks from a prize pool, a non-monetary award and any combination thereof.

11. The method of claim 1, which includes causing the at least one display device to displaying values associated initially with positions having the player chips even after the associated player chips are converted to game chips.

12. The method of claim 1, which includes structuring the table to be particular to a previous placement of one of the player chips.

13. The method of claim 1, which includes structuring the provided amount of player chips to be less than half of a total number of positions on the board.

14. The method of claim 1, wherein flanking the player chips on opposite sides includes flanking the player chips in a diagonal, horizontal or vertical line with game chips.

15. The method of claim 1, which includes structuring the award to include a combination of values associated with the remaining player chips.

16. The method of claim 15, which includes causing the at least one display device to displaying the values of the remaining player chips when the player chips are first displayed.

17. The method of claim 15, which includes providing player chips having displayed values to the player and enabling the player to selectively place the chips on the positions of the board.

18. The method of claim 1, which includes causing the at least one display device to displaying values associated with the player chips even after the associated player chips are converted to game chips.

19. The method of claim 1, which is played via a data network or a computer storage device.

20. The method of claim 19, wherein the data network includes an internet.

* * * * *

UNITED STATES PATENT AND TRADEMARK OFFICE

CERTIFICATE OF CORRECTION

PATENT NO. : 7,591,722 B2
APPLICATION NO. : 10/657409
DATED : September 22, 2009
INVENTOR(S) : Baerlocher et al.

It is certified that error appears in the above-identified patent and that said Letters Patent is hereby corrected as shown below:

In Claim 9, Column 26, Line 23, change “to displaying” to --to display--.

In Claim 11, Column 26, Line 32, change “to displaying” to --to display--.

In Claim 16, Column 26, Line 48, change “to displaying” to --to display--.

In Claim 18, Column 26, Line 56, change “to displaying” to --to display--.

Signed and Sealed this

Twenty-fourth Day of November, 2009

David J. Kappos
*Director of the United States Patent and Trademark Office*

UNITED STATES PATENT AND TRADEMARK OFFICE

CERTIFICATE OF CORRECTION

PATENT NO. : 7,591,722 B2
APPLICATION NO. : 10/657409
DATED : September 22, 2009
INVENTOR(S) : Baerlocher et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1500 days.

Signed and Sealed this

Twenty-first Day of September, 2010

David J. Kappos

*Director of the United States Patent and Trademark Office*